United States Patent
Ogawa et al.

(10) Patent No.: US 12,026,986 B2
(45) Date of Patent: Jul. 2, 2024

(54) CENTER DEVICE, IDENTIFICATION RESULT DISPLAY SYSTEM FOR VEHICLE STATE, NON-TRANSITORY TANGIBLE COMPUTER READABLE STORAGE MEDIUM, AND IDENTIFICATION RESULT TRANSMISSION METHOD FOR VEHICLE STATE

(71) Applicant: DENSO CORPORATION, Kariya (JP)

(72) Inventors: Tomoya Ogawa, Kariya (JP);
Yoshitaka Ozaki, Kariya (JP);
Yasufumi Iino, Kariya (JP)

(73) Assignee: DENSO CORPORATION, Kariya (JP)

( * ) Notice: Subject to any disclaimer, the term of this patent is extended or adjusted under 35 U.S.C. 154(b) by 762 days.

(21) Appl. No.: 17/159,606

(22) Filed: Jan. 27, 2021

(65) Prior Publication Data
US 2021/0150830 A1 May 20, 2021

Related U.S. Application Data

(63) Continuation of application No. PCT/JP2019/026644, filed on Jul. 4, 2019.

(30) Foreign Application Priority Data

Jul. 30, 2018 (JP) ................. 2018-142401

(51) Int. Cl.
*G07C 5/00* (2006.01)
*G06F 16/17* (2019.01)
(Continued)

(52) U.S. Cl.
CPC ......... *G07C 5/008* (2013.01); *G06F 16/1734* (2019.01); *G06F 16/1805* (2019.01); *G07C 5/085* (2013.01)

(58) Field of Classification Search
CPC ..... G07C 5/008; G07C 5/085; G06F 16/1734; G06F 16/1805; G06F 11/324;
(Continued)

(56) References Cited

U.S. PATENT DOCUMENTS

2010/0228404 A1* 9/2010 Link, II ............... G06F 9/44542
701/1
2013/0061169 A1 3/2013 Pearcy et al.
(Continued)

FOREIGN PATENT DOCUMENTS

JP H06102148 A 4/1994
JP 2009151568 A 7/2009
(Continued)

*Primary Examiner* — Adam R Mott
*Assistant Examiner* — Matthew C Gammon
(74) *Attorney, Agent, or Firm* — Harness, Dickey & Pierce, P.L.C.

(57) ABSTRACT

A center device includes a database storing a plurality of information items regarding a vehicle. The center device identifies a vehicle state by integrating the plurality of information items stored in the database. The center device generates visualization information to be displayed by a display device from an identification result of the vehicle state. The center device transmits the visualization information to the display device.

15 Claims, 18 Drawing Sheets

(51) Int. Cl.
  *G06F 16/18* (2019.01)
  *G07C 5/08* (2006.01)
(58) Field of Classification Search
  CPC ............. G06F 11/3013; G06F 2201/86; G06F 2221/034; G06F 21/57; B60W 50/02; B60W 50/14; B60W 2420/403; B60K 2370/167; B60K 2370/172; B60K 2370/5894; B60K 2370/5899; B60K 2370/592; B60K 35/00
  See application file for complete search history.

(56) References Cited

U.S. PATENT DOCUMENTS

| | | | |
|---|---|---|---|
| 2016/0055686 A1* | 2/2016 | Ukai | G07C 5/0808 |
| | | | 701/31.5 |
| 2016/0364230 A1* | 12/2016 | Moeller | H04L 67/10 |
| 2017/0060559 A1* | 3/2017 | Ye | G06F 8/65 |

FOREIGN PATENT DOCUMENTS

| | | | |
|---|---|---|---|
| JP | 2010191786 A | 9/2010 | |
| JP | 2014531652 A | 11/2014 | |
| JP | 2015010545 A | 1/2015 | |
| JP | 2015069618 A | 4/2015 | |

* cited by examiner

INITIAL REGISTRATION PROCESSING

CENTER DEVICE, IDENTIFICATION RESULT DISPLAY SYSTEM FOR VEHICLE STATE, NON-TRANSITORY TANGIBLE COMPUTER READABLE STORAGE MEDIUM, AND IDENTIFICATION RESULT TRANSMISSION METHOD FOR VEHICLE STATE

CROSS REFERENCE TO RELATED APPLICATIONS

The present application is a continuation application of International Patent Application No. PCT/JP2019/026644 filed on Jul. 4, 2019, which designated the U.S. and claims the benefit of priority from Japanese Patent Application No. 2018-142401 filed on Jul. 30, 2018. The entire disclosures of all of the above applications are incorporated herein by reference.

TECHNICAL FIELD

The present disclosure relates to a center device, an identification result display system for a vehicle state, a non-transitory tangible computer readable storage medium, and an identification result transmission method for the vehicle state.

BACKGROUND

In recent years, with the development of communication network technologies, technologies related to connected cars are developing. As a configuration for wirelessly updating a vehicle state using the technology of the connected car, for example, it is assumed that an application program installed in an electronic control device (hereinafter referred to as ECU (Electronic Control Unit)) of a vehicle is rewritten (reprogrammed) wirelessly. In the configuration in which the application program installed in the ECU is rewritten wirelessly, a vehicle master device that manages reprogram in the vehicle downloads reprogram data from a center device, distributes the downloaded reprogram data to a target ECU to be rewritten, and rewrites the application program.

SUMMARY

The present disclosure provides a center device that includes a database storing a plurality of information items regarding a vehicle. The center device identifies a vehicle state by integrating the plurality of information items stored in the database. The center device generates visualization information to be displayed by a display device from an identification result of the vehicle state. The center device transmits the visualization information to the display device.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
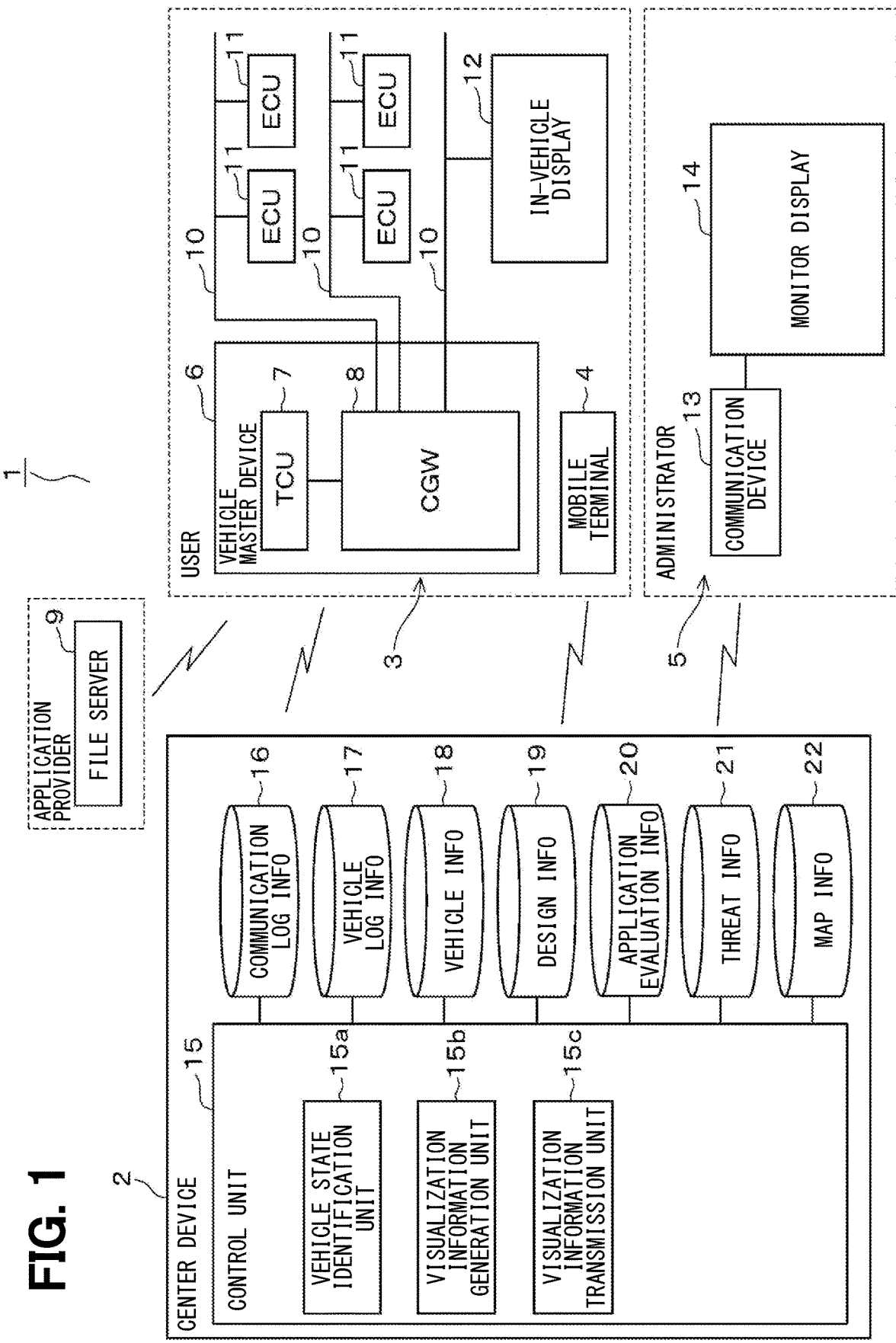
FIG. 1 is a diagram showing an entire configuration according to one embodiment.

For example, a configuration has been proposed in which progress of downloading of reprogram data from a center device to a master device mounted on a vehicle is displayed on an in-vehicle display to show the progress of downloading to a user.

This configuration can present the progress of downloading to a user. However, information whether downloaded reprogram data is normal data or abnormal data cannot be presented to the user. That is, the configuration in which the vehicle state is updated wirelessly only presents the progress of the update to the user by being visualized, but cannot present how the vehicle state is to the user. Under these circumstances, a technique for visualizing the vehicle state to the user is required for the purpose of giving the user a sense of safety and security. Further, a technique for presenting the vehicle state not only the user who uses the vehicle but also an administrator who monitors the vehicle is required.

The present disclosure to provide a center device, an identification result display system for a vehicle state, a non-transitory tangible computer readable storage medium, and an identification result transmission method for the vehicle state each of which can visualize a vehicle state and appropriately present the vehicle state to a user.

An exemplary embodiment of the present disclosure provides a center device that includes a data base and a processor. The database is configured to store a plurality of information items regarding a vehicle. The processor is configured to identify a vehicle state by integrating the plurality of information items stored in the database. The processor is configured to generate visualization information to be displayed by a display device from an identification result of the vehicle state. The processor is configured to transmit the visualization information to the display device. The database stores the plurality of information items including an information item acquired from the vehicle. The processor identifies, by integrating the plurality of information items, the vehicle state related to reprogram data downloaded from a file server to a vehicle master device.

In the exemplary embodiment of the present disclosure, by displaying the specific result of the vehicle state as the visualization information on the display device, it is possible to visualize how the vehicle state is and appropriately present the vehicle state to the user or the like.

Another exemplary embodiment of the present disclosure provides a center device that includes databases and a processor. The databases is configured to store a plurality of information items regarding a vehicle. The processor is configured to identify a vehicle state by integrating the plurality of information items stored in the databases. The processor is configured to generate visualization information to be displayed by a display device from an identification result of the vehicle state. The processor is configured to transmit the visualization information to the display device. The databases include a communication log information database storing a communication log information item related to data communication of an in-vehicle communication device for each vehicle, a vehicle log information database storing a vehicle log information item related to a behavior of each vehicle, and a threat information database storing a threat information item that threatens the behavior of the vehicle. The processor identifies the vehicle state by integrating at least two of the communication log information item, the vehicle log information item, and the threat information item.

In another exemplary embodiment of the present disclosure, by displaying the specific result of the vehicle state as the visualization information on the display device, it is possible to visualize how the vehicle state is and appropriately present the vehicle state to the user or the like.

Hereinafter, an embodiment will be described with reference to the drawings. An identification result display system for a vehicle state is a system for displaying an application evaluation result when an application program for vehicle control or diagnosis installed in an ECU of a vehicle is rewritten and a fault detection result when a fault is detected.

As shown in FIG. 1, an identification result display system 1 for the vehicle state includes a center device 2, a vehicle system 3 mounted on the vehicle used by a user, a mobile terminal 4 (display device) carried by the user, and a monitor system 5 that monitors a service for reprograming an application program. The mobile terminal 4 may be provided by a smartphone or a tablet having a Web browser. The center device 2, the vehicle system 3, the mobile terminal 4, and the monitor system 5 enable data communication via a communication network. The communication network includes, for example, a mobile communication network using 4G network, the Internet, WiFi (Wireless Fidelity) (registered trademark), and the like.

The vehicle system 3 includes a vehicle master device 6. The vehicle master device 6 is a device that manages the reprograming of the vehicle. The vehicle master device 6 includes an in-vehicle communication device (hereinafter, referred to as TCU (Telematics Communication Unit)) 7 and a vehicle gateway device (hereinafter, referred to as CGW (Central Gate Way)) 8. The TCU 7 and the CGW 8 are connected so that data communication is enabled. The TCU 7 enables data communication with a file server 9 managed by an application provider that provides the application program via a communication network.

The file server 9 manages the reprogram data for rewriting the application program, and transmits a distribution package in which the reprogram data is stored to the TCU 7 when a download request for the reprogram data from the outside is received. When the TCU 7 downloads the distribution package from the file server 9, the TCU 7 extracts the reprogram data from the downloaded distribution package and transfers the extracted reprogram data to the CGW 8.

The CGW 8 has a data relay function, and distributes the reprogram data to a target ECU to be rewritten for the application program when the reprogram data is transferred from the TCU 7. When the target ECU receives the reprogram data from the CGW 8, the target ECU writes the received reprogram data in the flash memory to rewrite the application program.

Various ECUs 11 and an in-vehicle display 12 (display device) are connected to the CGW 8 via a bus 10. The bus 10 is, for example, a body bus, a traveling bus, a multimedia bus, or the like. The ECUs 11 connected to the body bus include, for example, a door ECU for controlling locking/unlocking of doors, a meter ECU for controlling a meter display, an air conditioning ECU for controlling an air conditioner, a window ECU for controlling opening/closing of windows. The ECUs 11 connected to the traveling bus include, for example, an engine ECU for controlling an engine, a brake ECU for controlling braking operation, a ECT ECU for controlling automatic transmission operation, a power steering ECU for controlling power steering operation. The ECUs 11 connected to the multimedia bus include, for example, a navigation ECU for controlling a navigation system, an ETC ECU for controlling an electronic toll collection system (ETC: electronic toll collection system (a registered trademark)). The bus 10 may be a bus other than the body bus, the traveling bus, the multimedia bus. For example, the bus 10 may be a driving support bus, a power train bus, a chassis bus, or the like. The number of the buses 10 and the ECUs 11 are not necessarily limited to the numbers described above.

When the vehicle master device 6 downloads the distribution package from the file server 9, the vehicle master device 6 extracts the reprogram data from the downloaded distribution package as described above and acquires application attribute information of the extracted reprogram data. The application attribute information is information necessary for the center device 2 to evaluate the application program, and includes, for example, a file name, a file publisher, a hash, and the like. When the vehicle master device 6 receives a request for the application attribute information from the center device 2, the vehicle master device 6 transmits the acquired application attribute information to the center device 2.

When the vehicle master device 6 receives a request for communication log information from the center device 2, the vehicle master device 6 transmits the communication log information to the center device 2. The communication log information is information related to the data communication of TCU 7, and includes, for example, a communication partner, communication time, communication data amount, and the like. When the vehicle master device 6 receives a request for vehicle log information from the center device 2, the vehicle master device 6 transmits the vehicle log information to the center device 2. The vehicle log information is information related to behavior of the vehicle, and includes, for example, an operating state of the ECU 11, a vehicle position, and the like.

The in-vehicle display 12 is, for example, a display having a navigation function or a meter display arranged in a meter device, and has a function of displaying various display screens. When the application program installed in the ECU 11 is rewritten while the user rides on the vehicle, a series of various procedures related to the reprogram for the application program can be carried out by the user performing the operation input while checking a series of various screens related to the reprogram such as acceptance of the reprogram and installation instruction on the in-vehicle display 12. When the application program installed in the ECU 11 is rewritten while the user does not ride on the vehicle, a series of various procedures related to the reprogram for the application program can be carried out by the user performing the operation input while checking a series of various screens related to the reprogram on the mobile terminal 4. That is, the user can appropriately use the in-vehicle display 12 and the mobile terminal 4 for respectively inside and outside the vehicle, and can perform a series of various procedures related to the reprogram of the application program.

The monitor system 5 includes a communication device 13 and a monitor display 14 (display device). The communication device 13 performs data communication with the center device 2 through the communication network. The monitor display 14 displays various display screens.

The center device 2 includes a control unit 15, a communication log information database 16, a vehicle log information database 17, a vehicle information database 18, a design information database 19, an application evaluation information database 20, a threat information database 21, and a map information database 22.

The control unit 15 includes a microcomputer having a CPU (central processing unit), a ROM (read only memory), a RAM (random access memory), and the like. The control unit 15 executes a control program stored in a non-transitory tangible storage medium to perform various processes and controls the operation of the center device 2. The control program executed by the control unit 15 includes an identification result transmission program for the vehicle state.

The communication log information database 16 is a database that stores communication log information for each vehicle. For example, when the TCU 7 performs normal data communication when the TCU 7 is accessed to a normal communication partner, the communication log information indicating that the normal data communication is performed is transmitted from the vehicle master device 6 to the center device 2. The communication log information database 16 stores the communication log information indicating the normal data communication by the center device 2 receiving the communication log information indicating normal data communication. When the TCU 7 performs abnormal data communication when the TCU 7 is accessed to an abnormal communication partner (illegal access), the communication log information indicating that the abnormal data communication is performed is transmitted from the vehicle master device 6 to the center device 2. The communication log information database 16 stores the communication log information indicating the abnormal data communication by the center device 2 receiving the communication log information indicating the abnormal data communication.

The vehicle log information database 17 is a database that stores vehicle log information for each vehicle. For example, when the reprogram data downloaded from the file server 9 is normal data and the behavior of the application program reprogrammed by the written normal reprogram data, the vehicle log data indicating the normal behavior is transmitted from the vehicle master device 6 to the center device 2. The vehicle log information database 17 stores the vehicle log information indicating the normal behavior by the center device 2 receiving the vehicle log information indicating the normal behavior. For example, when the reprogram data downloaded from the file server 9 is abnormal data (for example, forgery data) and the behavior of the application program reprogrammed by the written abnormal reprogram data, the vehicle log data indicating the abnormal behavior is transmitted from the vehicle master device 6 to the center device 2. The vehicle log information database 17 stores the vehicle log information indicating the abnormal behavior by the center device 2 receiving the vehicle log information indicating the abnormal behavior.

The vehicle information database 18 is a database that stores vehicle specifications. The vehicle information database 18 stores the vehicle information by, for example, a person in charge of a vehicle maker or a dealer performing a vehicle information registration operation after the vehicle is shipped from the factory. The design information database 19 is a database that stores design information indicating matters related to vehicle design. The design information database 19 stores the design information by, for example, a person in charge of a vehicle maker or a dealer performing a design information registration operation after the vehicle is shipped from the factory.

The application evaluation information database 20 is a database that stores application evaluation information indicating the evaluation of the application program such as whether the application program is a normal application program or an abnormal application program. The application evaluation information database 20 stores the application evaluation information by, for example, an administrator, who manages the application program, performing the registration operation of the application evaluation information.

The threat information database 21 is a database that stores threat information that threatens the behavior of the vehicle. The threat information database 21 stores the threat information by, for example, an administrator, who manages access to the TCU 7 from the outside, performing a threat information registration operation. The map information database 22 is a database that stores map information. The map information database 22 stores the map information by, for example, a provider, who provides the map information, performing a map information registration operation.

The control unit 15 includes a vehicle state identification unit 15*a*, a visualization information generation unit 15*b*, and a visualization information transmission unit 15*c*. Each of these functional blocks 15*a* to 15*c* is provided by software. The vehicle state identification unit 15*a* identifies the vehicle state by integrating a plurality of information items. That is, the vehicle state identification unit 15*a* identifies the vehicle state by integrating any of the communication log information stored in the communication log information database 16, the vehicle log information stored in the vehicle log information database 17, the vehicle information stored in the vehicle information database 18, the design information stored in the design information database 19, the application evaluation information stored in the application evaluation information database 20, the threat information stored in the threat information database 21, and the map information stored in the map information database 22.

The vehicle state identification unit 15*a* evaluates the application program as an example of identifying the vehicle state. The vehicle state identification unit 15*a* transmits a request for acquiring the application attribute information to the vehicle master device 6, and acquires the application attribute information from the vehicle master device 6.

When the vehicle state identification unit 15a acquires the application attribute information from the vehicle master device 6, the vehicle state identification unit 15a identifies the file name from the application attribute information, searches the application evaluation information database 20, and acquires the application evaluation information corresponding to the identified file name from the application evaluation information database 20.

When the vehicle state identification unit 15a acquires the application evaluation information corresponding to the identified file name from the application evaluation information database 20, the vehicle state identification unit 15a evaluates the application program by comparing the application attribute information acquired from the vehicle master device 6 with the application evaluation information acquired from the application evaluation information database 20. As a specific method for evaluating the application program, the vehicle state identification unit 15a may calculate an evaluation point by comparing a plurality of evaluation items of the application attribute information acquired from the vehicle master device 6 with a plurality of evaluation items defined by the application evaluation information, and compares the calculated evaluation point with a threshold value.

When determining that the calculated evaluation point is equal to or greater than the threshold value, the vehicle state identification unit 15a determines that the application attribute information acquired from the vehicle master device 6 is normal and the reprogram data downloaded from the file server 9 is normal data. When determining that the calculated evaluation point is less than the threshold value, the vehicle state identification unit 15a determines that the application attribute information acquired from the vehicle master device 6 is abnormal and the reprogram data downloaded from the file server 9 is abnormal data. The method for evaluating the application program is not limited to the method for calculating the evaluation point described above, and other methods may be applied.

The vehicle state identification unit 15a detects an abnormality as another example for identifying the vehicle state. The vehicle state identification unit 15a transmits a request for the communication log information to the vehicle master device 6, acquires the communication log information from the vehicle master device 6, and stores the acquired communication log information in the communication log information database 16. The vehicle state identification unit 15a transmits a request for the vehicle log information to the vehicle master device 6, acquires the vehicle log information from the vehicle master device 6, and stores the acquired vehicle log information in the vehicle log information database 17.

The vehicle state identification unit 15a acquires the threat information from the threat information database 21, and acquires the map information from the map information database 22. The vehicle state identification unit 15a detects an abnormality by monitoring the communicate log information database 16 and vehicle log information database 17 using the acquired threat information and map information. That is, the vehicle state identification unit 15a identifies the data communication status of the TCU 7 from the communication log information, identifies the vehicle behavior from the vehicle log information, and detects an abnormality by determining whether the identified data communication status and vehicle behavior correspond to the threat information and the map information. As a specific method for detecting an abnormality, when download of abnormal file occur frequently in a specific time zone or a specific area, the vehicle state identification unit 15a may respectively compare the time zone and the vehicle position of the data communication of the TCU 7 with the specific time zone and the specific area. The vehicle state identification unit 15a detects an abnormality when determining that the time zone and the vehicle position of the data communication of the TCU 7 correspond to the specific time zone and the specific area.

When the vehicle state identification unit 15a identifies the vehicle state, the visualization information generation unit 15b generates visualization information capable of displaying the identified result on the mobile terminal 4, the in-vehicle display 12, or the monitor display 14. That is, when it is determined that the reprogram data is normal data, the visualization information generation unit 15b generates, as the visualization information, the application evaluation result that indicates that the reprogram data is normal data. When it is determined that the reprogram data is abnormal data, the visualization information generation unit 15b generates, as the visualization information, the application evaluation result that indicates that the reprogram data is abnormal data. When an abnormality is detected, the visualization information generation unit 15b generates an abnormality detection result indicating that the abnormality has been detected as the visualization information.

When the visualization information generation unit 15b generates the visualization information, the visualization information transmission unit 15c transmits the generated visualization information to the mobile terminal 4, the in-vehicle display 12, or the monitor display 14. When the application evaluation result is generated, the visualization information transmission unit 15c transmits the generated application evaluation result to the mobile terminal 4, the in-vehicle display 12, or the monitor display 14. When the abnormal detection result is generated, the visualization information transmission unit 15c transmits the generated abnormal detection result to the mobile terminal 4, the in-vehicle display 12, or the monitor display 14.

Figure 2:
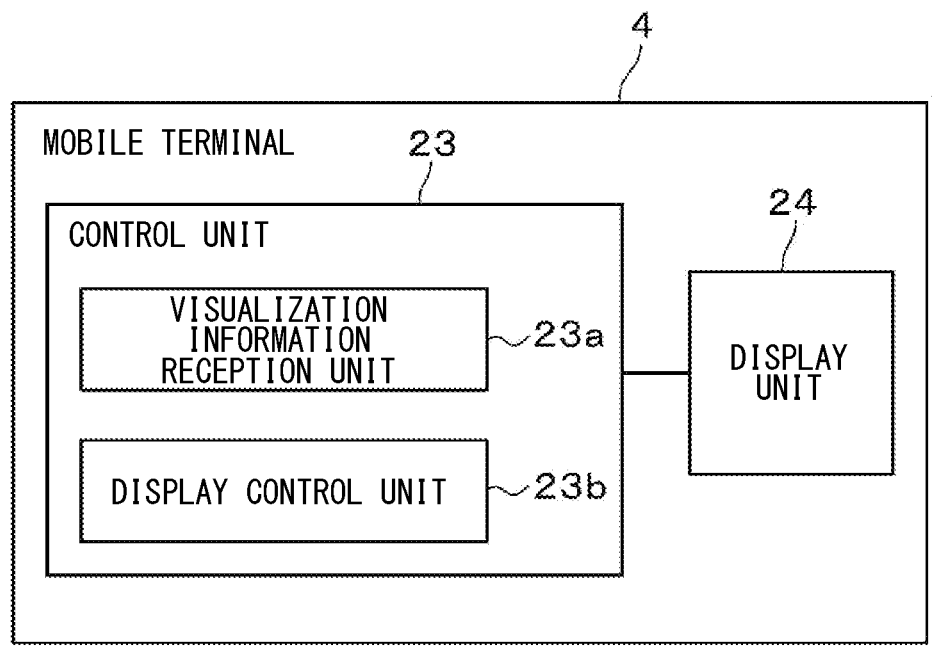
FIG. 2 is a functional block diagram showing a mobile terminal.

As shown in FIG. 2, the mobile terminal 4 includes a control unit 23 and a display unit 24. The control unit 23 includes a microcomputer having a CPU, a ROM, a RAM or the like, executes various control programs stored in a non-transitional tangible storage medium to perform various types of processing, thereby controlling the operation of the in-vehicle display 12. The control program executed by the control unit 23 includes an identification result display program for the vehicle state.

The control unit 23 includes a visualization information reception unit 23a and a display control unit 23b. Each of these functional blocks 23a and 23b is provided by software. The visualization information reception unit 23a receives the visualization information from the center device 2. When the visualization information reception unit 23a receives the visualization information from the center device 2, the display control 23b causes the display unit 24 to display the display screen including the received visualization information. The mobile terminal 4 has a function of inputting voice, a function of outputting voice, and a function of executing various applications such as managing an individual's schedule.

Figure 3:
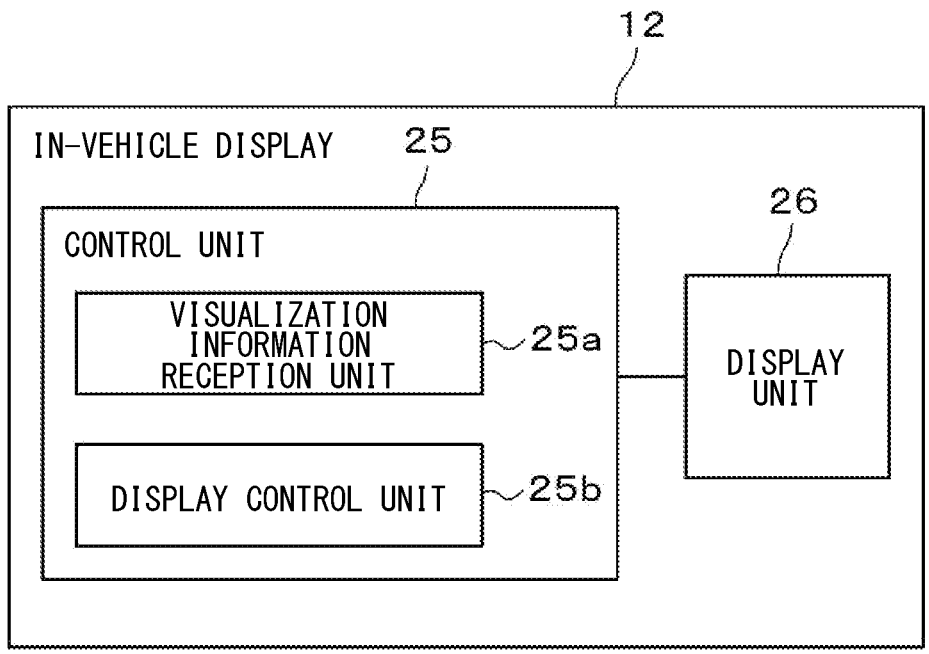
FIG. 3 is a functional block diagram showing an in-vehicle display.

As shown in FIG. 3, the in-vehicle display 12 includes a control unit 25 and a display unit 26. The control unit 25 includes a microcomputer having a CPU, a ROM, a RAM or the like, executes various control programs stored in a non-transitional tangible storage medium to perform various types of processing, thereby controlling the operation of the in-vehicle display 12. The control program executed by the control unit 25 includes an identification result display program for the vehicle state.

The control unit 25 includes a visualization information reception unit 25a and a display control unit 25b. Each of these functional blocks 25a and 25b is provided by software. The visualization information reception unit 25a receives the visualization information from the center device 2. When the visualization information reception unit 25a receives the visualization information from the center device 2, the display control 25b causes the display unit 26 to display the display screen including the received visualization information.

That is, on the user side, when the application evaluation result or the abnormality detection result transmitted from the center device 2 is received by the mobile terminal 4 or the in-vehicle display 12, the mobile terminal 4 or the in-vehicle display 12 displays the received application evaluation result or the received abnormality detection result. The user is capable of grasping whether the reprogram data is normally executed, whether the abnormality is detected, or the like by displaying the application evaluation result or the abnormality detection result on the mobile terminal 4 or the in-vehicle display 12.

Figure 4:
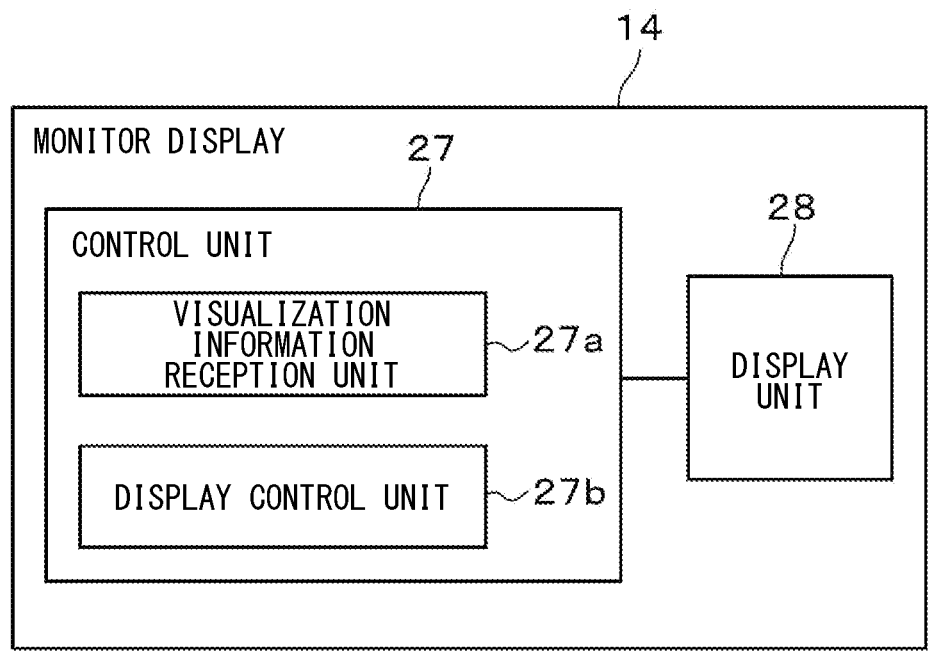
FIG. 4 is a functional block diagram showing a monitor display.
Figure 5:
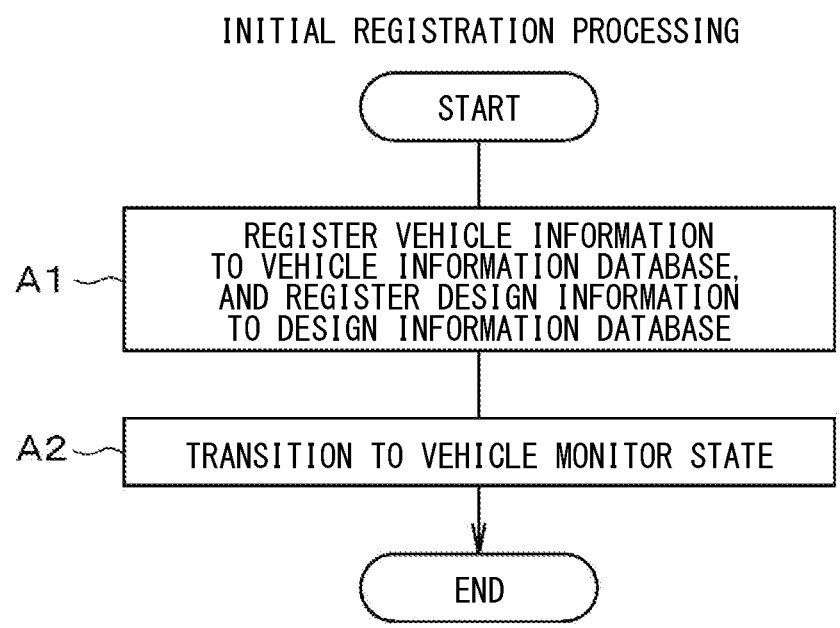
FIG. 5 is a flowchart showing an initial registration processing of a center device.
Figure 6:
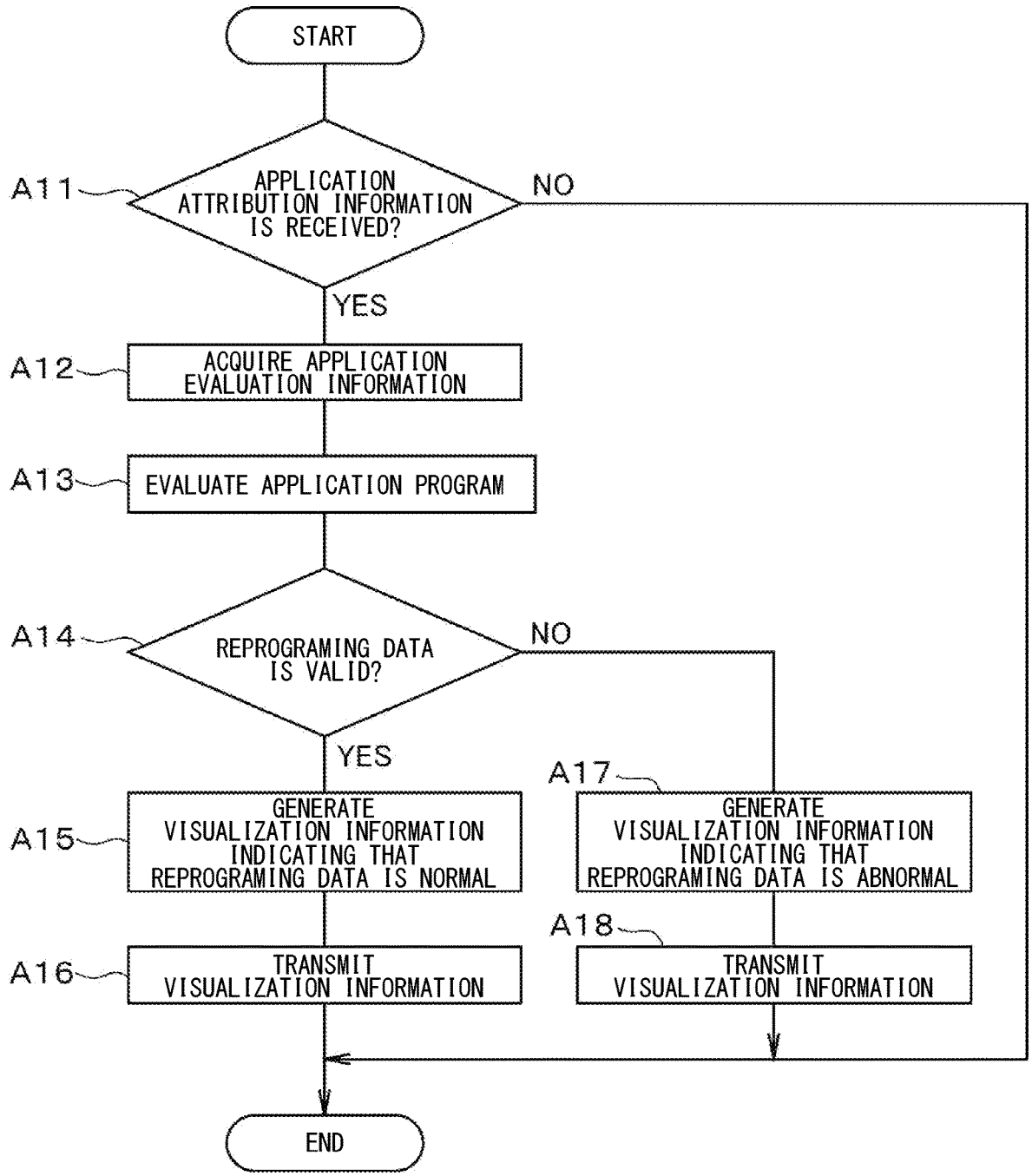
FIG. 6 is a flowchart showing an application program evaluation processing of the center device.
Figure 7:
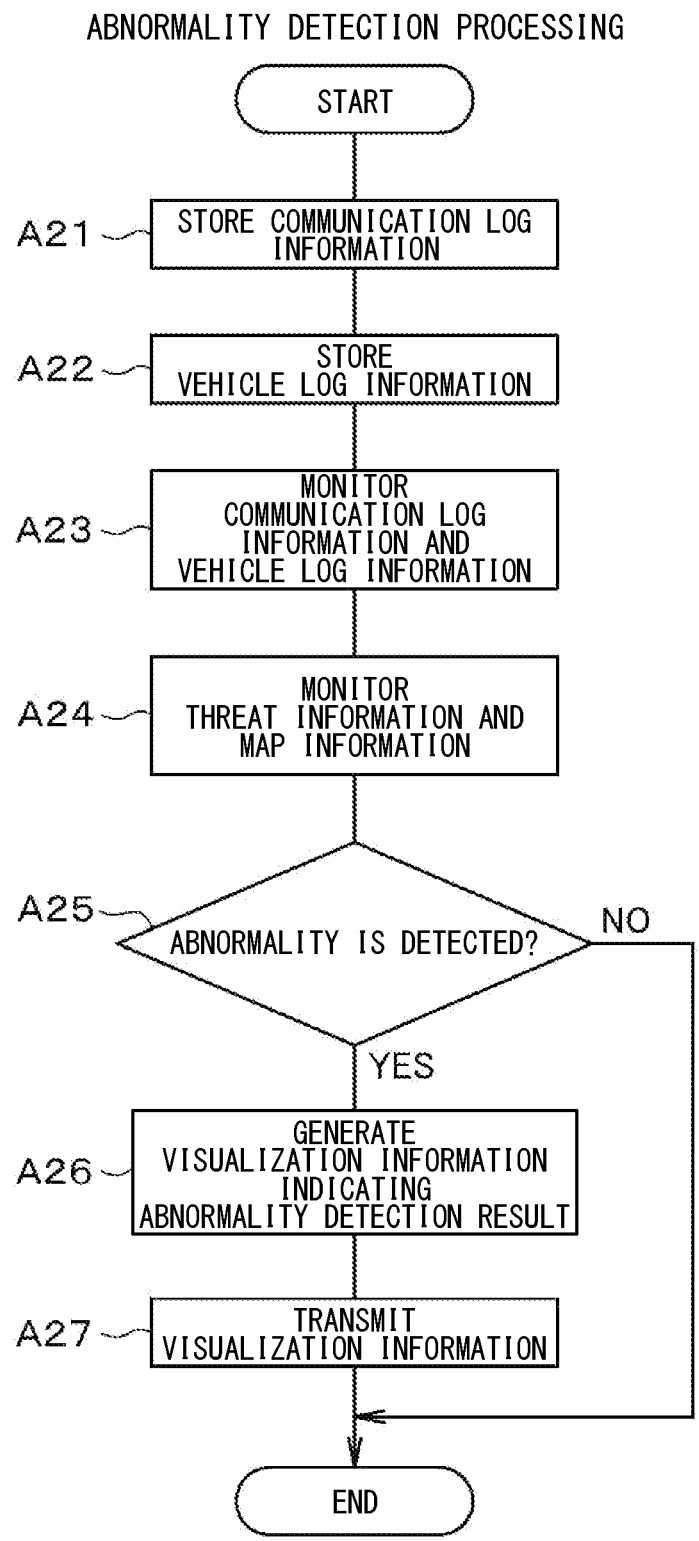
FIG. 7 is a flowchart showing an abnormality detection processing of the center device.
Figure 8:
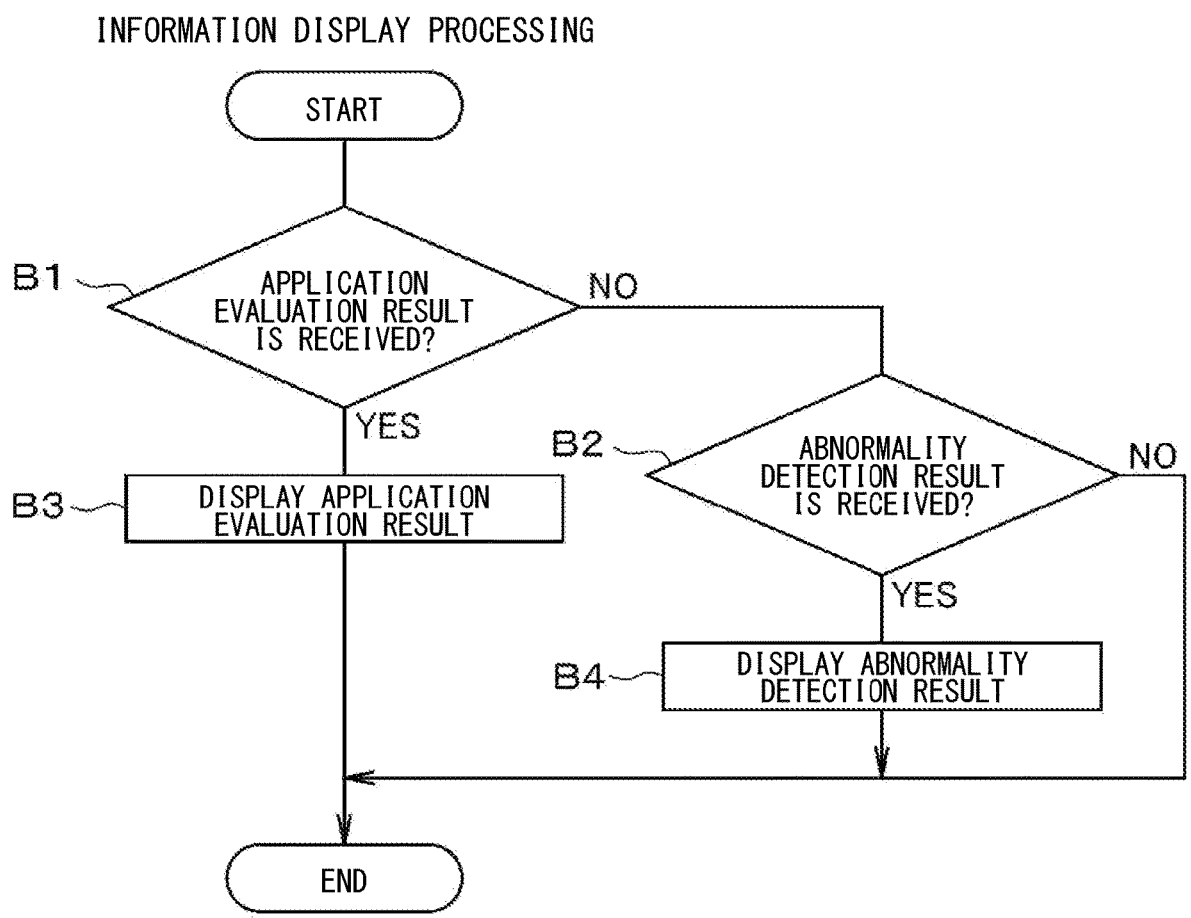
FIG. 8 is a flowchart showing an information display processing in the mobile terminal, the in-vehicle display, and the monitor display.

As shown in FIG. 4, the monitor display 14 includes a control unit 27 and a display unit 28. The control unit 27 includes a microcomputer having a CPU, a ROM, a RAM or the like, executes various control programs stored in a non-transitional tangible storage medium to perform various types of processing, thereby controlling the operation of the monitor display 14. The control program executed by the control unit 27 includes an identification result display program for the vehicle state.

The control unit 27 includes a visualization information reception unit 27a and a display control unit 27b. Each of these functional blocks 27a and 27b is provided by software. The visualization information reception unit 27a receives the visualization information from the center device 2. When the visualization information reception unit 27a receives the visualization information from the center device 2, the display control 27b causes the display unit 28 to display the display screen including the received visualization information.

That is, on the administrator side, when the application evaluation result or the abnormality detection result transmitted from the center device 2 is received by the monitor display 14, the monitor display 14 displays the received application evaluation result or the received abnormality detection result. The administrator is capable of grasping whether the reprogram data is normally executed, whether the abnormality is detected, or the like by displaying the application evaluation result or the abnormality detection result on the monitor display 14.

The display mode may be different between the display screen displayed on the mobile terminal 4 or the in-vehicle display 12 on the user side and the display screen displayed on the monitor display 14 on the administrator side. That is, for example, in a case of showing a display screen of the abnormality detection result, the user requires the abnormality detection information limited to the subject vehicle. Thus, in this case, it is desirable to display the information specialized for the abnormality detected in the subject vehicle. On the other hand, the administrator may be widely requires not only the information of the abnormality detection of the subject vehicle but also the information of the unspecified number of abnormality detections targeting the same vehicle type as the subject vehicle. Thus, in this case, it is desirable to display the information of the unspecified number of abnormality detections. That is, since the nature of the required information differs between the user side and the administrator side, the display mode may be different between the display screen displayed on the mobile terminal 4 or the in-vehicle display 12 on the user side and the display screen displayed on the monitor display 14 on the administrator side.

Next, the process of the above configuration will be described with reference to FIGS. 5 to 21. Here, as the processing performed by the center device 2, initial registration processing performed at the time of initial registration, application program evaluation processing for evaluating the application program, and the abnormality detection processing for detecting an abnormality will be described. Further, as processing performed by the mobile terminal 4, the in-vehicle display 12, or the monitor device 14, information display processing will be described.

(1) Processing Performed by the Center Device 2

(1-1) Initial Registration Processing

In the center device 2, the control unit 15 starts the initial registration processing when the vehicle is shipped from the factory and the vehicle information and the design information regarding the shipped vehicle are input. When the control unit 15 starts the initial registration processing, the control unit 15 registers the vehicle information about the vehicle in the vehicle information database 18 and registers the design information about the vehicle in the design information database 19 (A1). When the control unit 15 completes the registration of the vehicle information and the design information, the control unit 15 subsequently shifts to the vehicle monitor state for monitoring the vehicle for which the registration of the vehicle information and the design information has been completed (A2), and terminates the initial registration processing.

(1-2) Application Program Evaluation Processing

In the center device 2, when the control unit 15 shifts to the vehicle monitor state, the application program evaluation processing is periodically performed at a predetermined cycle. When the application program evaluation processing is started, the control unit 15 determines whether the application attribute information has been received from the vehicle master device 6 (A11). When the control unit 15 determines that the application attribute information has not been received from the vehicle master device 6 (A11: NO), the control unit 15 terminates the application program evaluation processing.

When the control unit 15 determines that the application attribute information has been received from the vehicle master device 6 (A11: YES), the control unit 15 acquires the application evaluation information from the application evaluation information database 19 (A12), and evaluates the application program by comparing the received application attribute information with the application evaluation information acquired from the application evaluation information database 19 (A13, vehicle state identification process). The control unit 15 calculates an evaluation point by comparing a plurality of evaluation items of the application attribute information acquired from the vehicle master device 6 with a plurality of evaluation items defined by the application evaluation information, and compares the calculated evaluation point with a threshold value. When determining that the calculated evaluation point exceeds the threshold value, the control unit 15 determines that the application attribute information acquired from the vehicle master device 6 is normal and the reprogram data downloaded from the file server 9 is normal data (A14: YES). When determining that the reprogram data is normal data, the control unit 15 generates, as the visualization information, the application evaluation result indicating that the reprogram data is normal data (A15, visualization information generation process). When the control unit 15 generates the visualization information, the control unit 15 transmits the generated visualization information of the application evaluation result to the mobile terminal 4, the vehicle master device 6 and the communication device 13 (A16, visualization information transmission process), and terminates the application program evaluation process.

When determining that the calculated evaluation point is less than the threshold value, the control unit 15 determines that the application attribute information acquired from the vehicle master device 6 is abnormal and the reprogram data downloaded from the file server 9 is abnormal data (A14: NO). When determining that the reprogram data is abnormal data, the control unit 15 generates, as the visualization information, the application evaluation result indicating that the reprogram data is abnormal data (A17, visualization information generation process). When the control unit 15 generates the visualization information, the control unit 15 transmits the generated visualization information of the application evaluation result to the mobile terminal 4, the vehicle master device 6 and the communication device 13 (A18, visualization information transmission process), and terminates the application program evaluation processing.

(1-3) Abnormality Detection Processing

In the center device 2, when the control unit 15 shifts to the vehicle monitor state, the abnormality detection processing is periodically performed at a predetermined cycle. When the control unit 15 starts the abnormality detection processing, the control unit 15 transmits a request for the communication log information to the vehicle master device 6, periodically acquires the communication log information from the vehicle master device 6, and stores the acquired communication log information in the communication log information database 15 (A21). The control unit 15 transmits a request for the vehicle log information to the vehicle master device 6, periodically acquires the vehicle log information from the vehicle master device 6, and stores the acquired vehicle log information in the vehicle log information database 16 (A22).

The control unit 15 monitors the communication log information database 15 and the vehicle log information database 16 (A23), monitors the threat information database 20 and the map information database 22 (A24), and monitors abnormality detection (A25, vehicle state identification process). The download of abnormal file occur frequently in a specific time zone or a specific area. In this case, when the control unit 15 determines that the time zone or the vehicle position of the data communication of the TCU 7 matches with the specific time zone and the specific area, the control unit 15 determines that an abnormality is detected (A25: YES). When determining that abnormality is detected, the control unit 15 generates the visualization information indicating that an abnormality is detected (A26, visualization information generation process). When generating the visualization information, the control unit 15 transmits the generated visualization information of the abnormality detection result to the mobile terminal 4, the vehicle master device 6 and the communication device 13 (A27, visualization information transmission process), and terminates the abnormality detection processing.

(2) Processing Performed by the Mobile Terminal 4, the in-Vehicle Display 12, and the Monitor Display 14.

Since the information display processing performed by the mobile terminal 4, the information display processing performed by the in-vehicle display 12, and the information display processing performed by the monitor display 14 are basically the same, the information display processing performed by the mobile terminal 4 will be described here.

In the mobile terminal 4, the control unit 23 periodically performs the information display processing at a predetermined cycle. When the information display processing is started, the control unit 23 determines whether the visualization information of the application evaluation result is received from the center device 2 (B1), and whether the visualization information of the abnormality detection result is received from the center device 2 (B2, visualization information reception process).

When determining that the visualization information of the application evaluation result is received from the center device 2 (B1: YES), the control unit 23 causes the display unit 24 to display a display screen including the visualization information of the received application evaluation result (B3, display control process) and terminates the information display processing. That is, when determining that the visualization information of the application evaluation result indicating that the reprogram data is normal data is received, the control unit 23 causes the display unit 24 to display the application evaluation result indicating that the reprogram data is normal data. When determining that the visualization information of the application evaluation result indicating that the reprogram data is abnormal data is received, the control unit 23 causes the display unit 24 to display the application evaluation result indicating that the reprogram data is abnormal data.

When determining that the visualization information of the abnormality detection result is received from the center device 2 (B2: YES), the control unit 23 causes the display unit 24 to display a display screen including the visualization information of the received abnormality detection result (B4) and terminates the information display processing. The in-vehicle display 12 and the monitor display 14 perform information display processing equivalent to that of the mobile terminal 4 described above.

Figure 9:
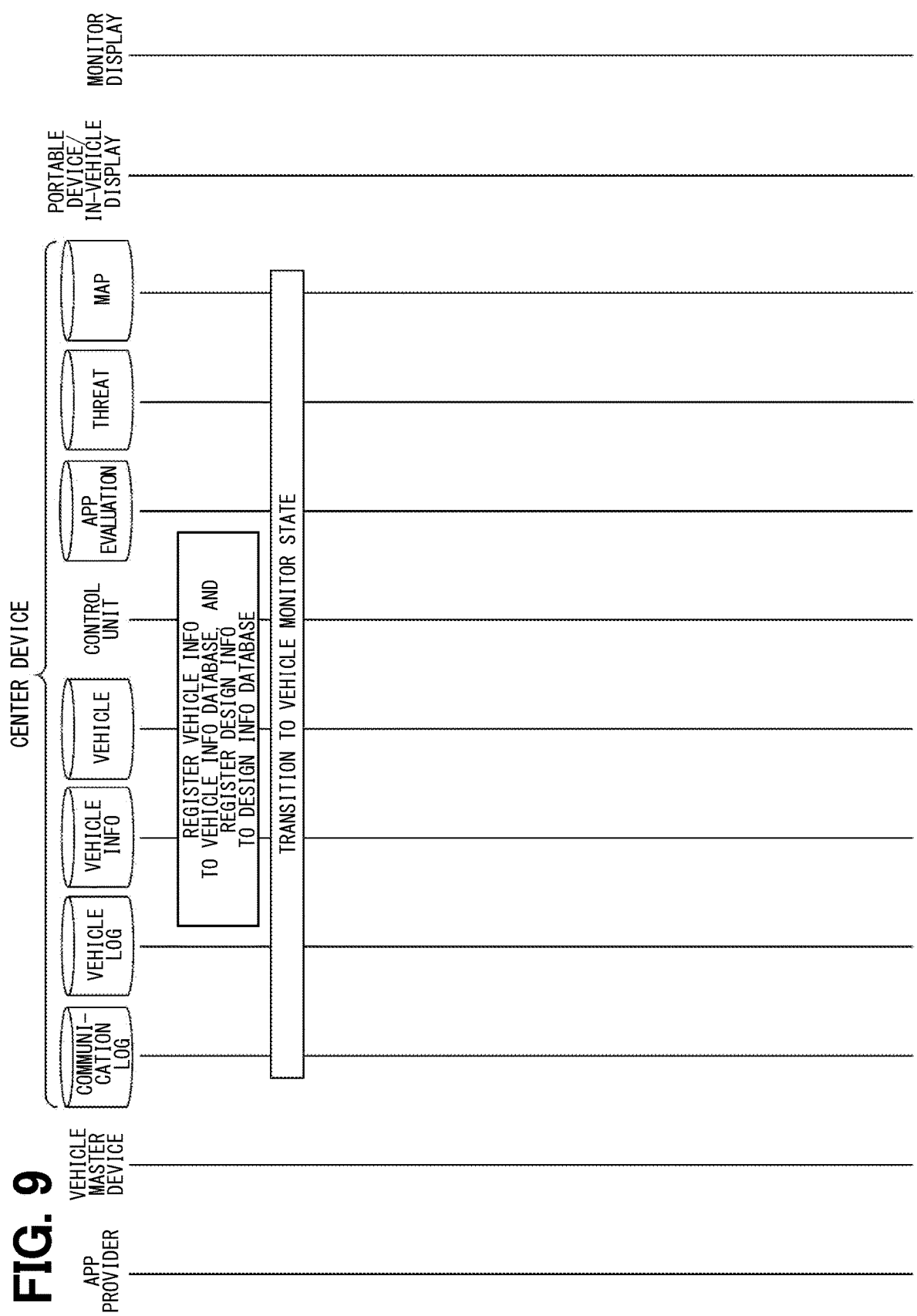
FIG. 9 is a first sequence diagram.

Hereinafter, the flow of information in the vehicle master device 6, the center device 2, the mobile terminal 4, the in-vehicle display 12, and the monitor display 14 will be described. FIG. 9 shows a sequence diagram when the control unit 15 performs the initial registration processing in the center device 2.

Figure 10:
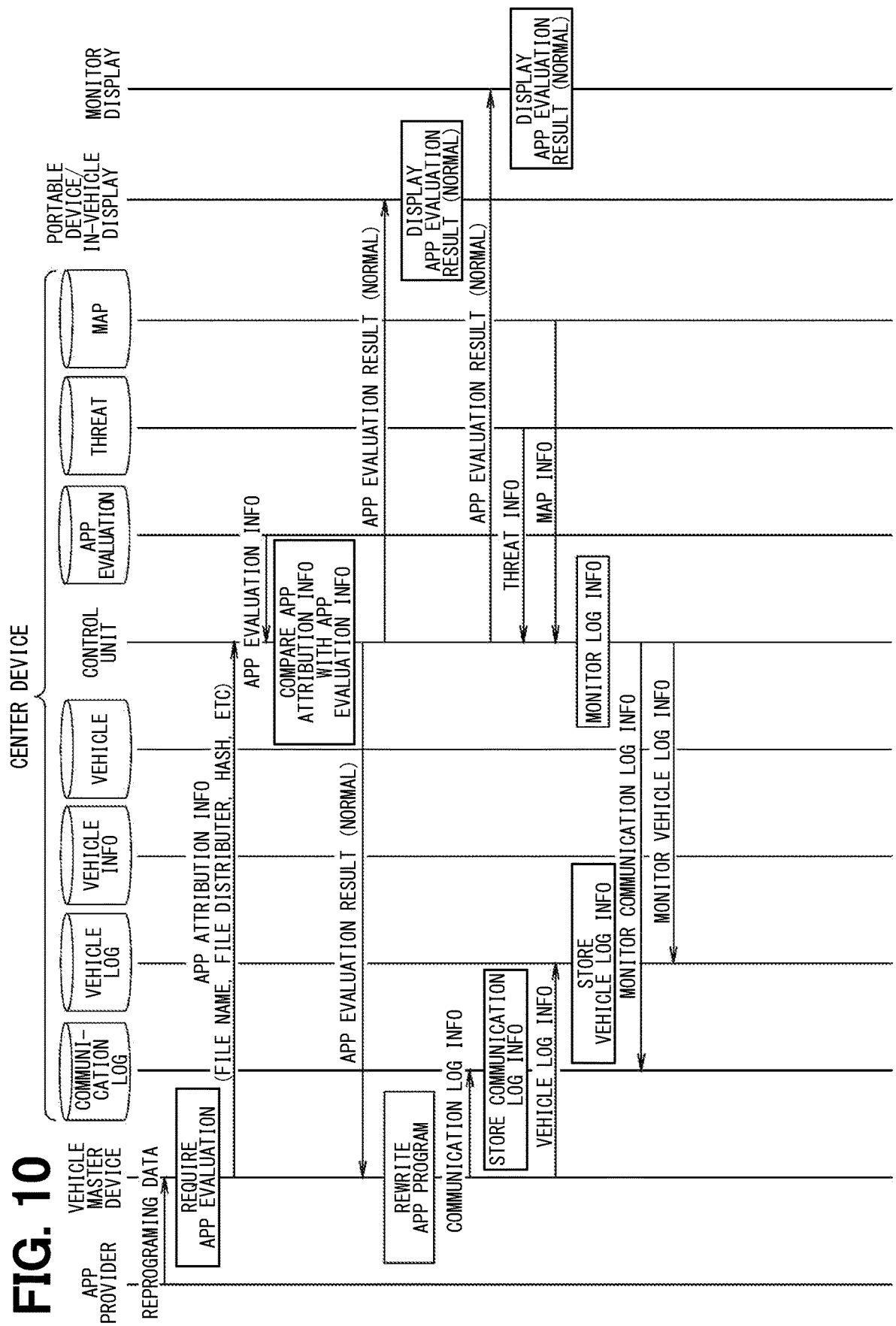
FIG. 10 is a second sequence diagram.

FIG. 10 shows a sequence diagram in a case where, in the center device 2, the control unit 15 performs the application program evaluation processing, and determines that the reprogram data is normal data, and then the control unit 15 performs the abnormality detection processing and does not detect the abnormality. When downloading the reprogram data from the file server 9, the vehicle master device 6 requests the center device 2 to evaluate the application of the downloaded reprogram data, and transmits the application attribute information to the center device 2. When the center device 2 determines that the reprogram data is normal data, the vehicle master device 6 receives the application evaluation result indicating that the reprogram data is normal data from the center device 2, distributes the reprogram data downloaded from the file server 9 to the target ECU, and rewrites the application program.

When the mobile terminal 4, the in-vehicle display 12, and the monitor display 14 receive the application evaluation result indicating that the reprogram data is normal data from the center device 2, the received application evaluation result is displayed.

When the vehicle master device 6 completes the rewriting of the application program, the vehicle master device 6 uploads the communication log information and the vehicle log information to the center device 2. When the communication log information and the vehicle log information are uploaded from the vehicle master device 6, the center device 2 stores the uploaded communication log information and vehicle log information in the communication log information database 16 and the vehicle log information database 17, respectively. The center device 2 acquires the threat information from the threat information database 21, acquires the map information from the map information database 22. The center device 2 monitors the communicate log information database 16 and vehicle log information database 17 using the acquired threat information and map information. When not detecting an abnormality, the center device 2 continues to monitor the communication log information database 16 and the vehicle log information database 17.

Figure 11:
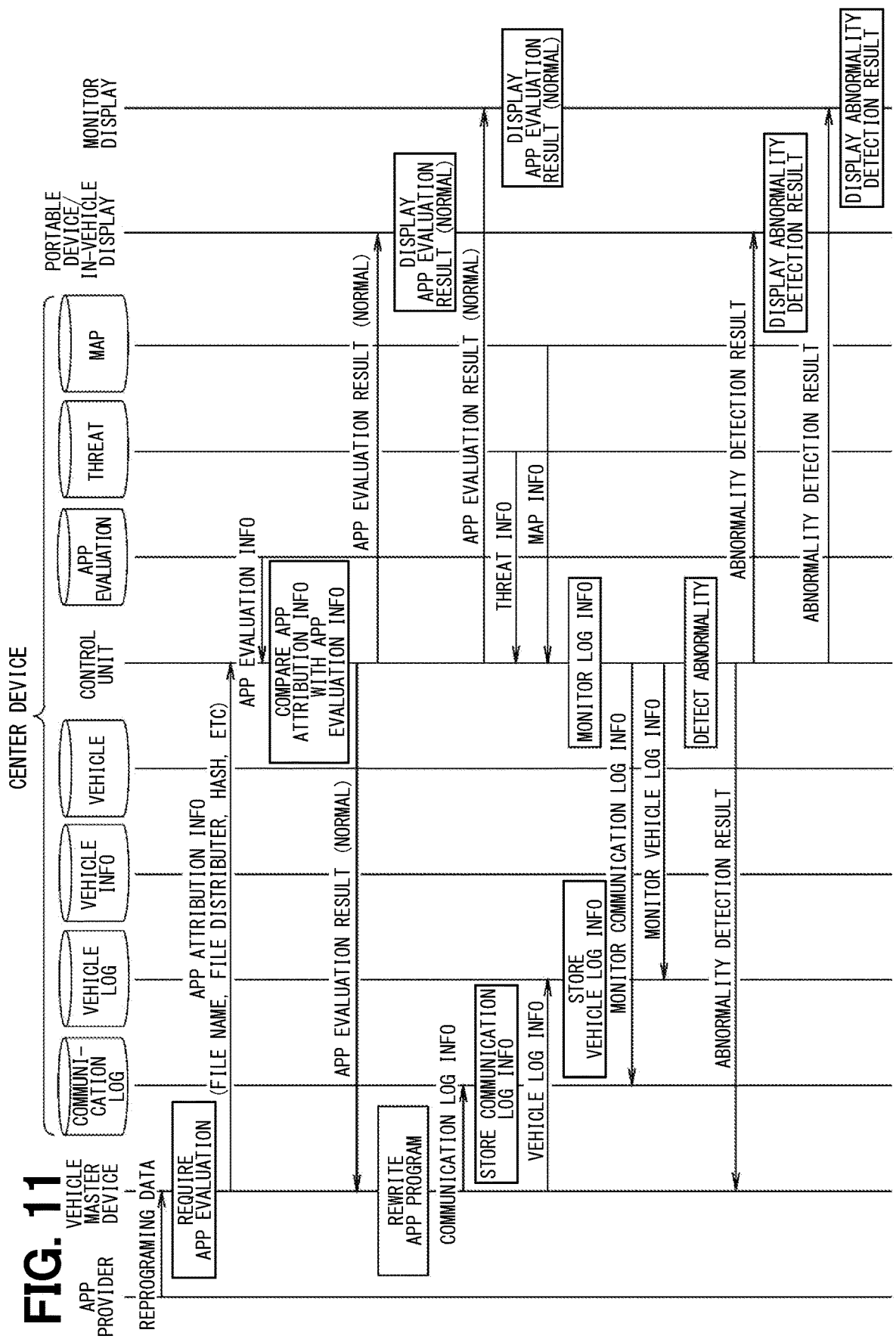
FIG. 11 is a third sequence diagram.

FIG. 11 shows a sequence diagram in a case where, in the center device 2, the control unit 15 performs the application program evaluation processing, and determines that the reprogram data is normal data, and then the control unit 15 performs the abnormality detection processing and detects the abnormality. When the center device 2 determines that the reprogram data is normal data at the time of the downloading of the reprogram data from the file server 9 to the vehicle master device 6, the vehicle master device 6 rewrites the application program, and detects the abnormality by monitoring the log information after the application program is rewritten. When the mobile terminal 4, the in-vehicle display 12, and the monitor display 14 receive the abnormality detection result from the center device 2 after displaying the application evaluation result, the received abnormality detection result is displayed.

Figure 12:
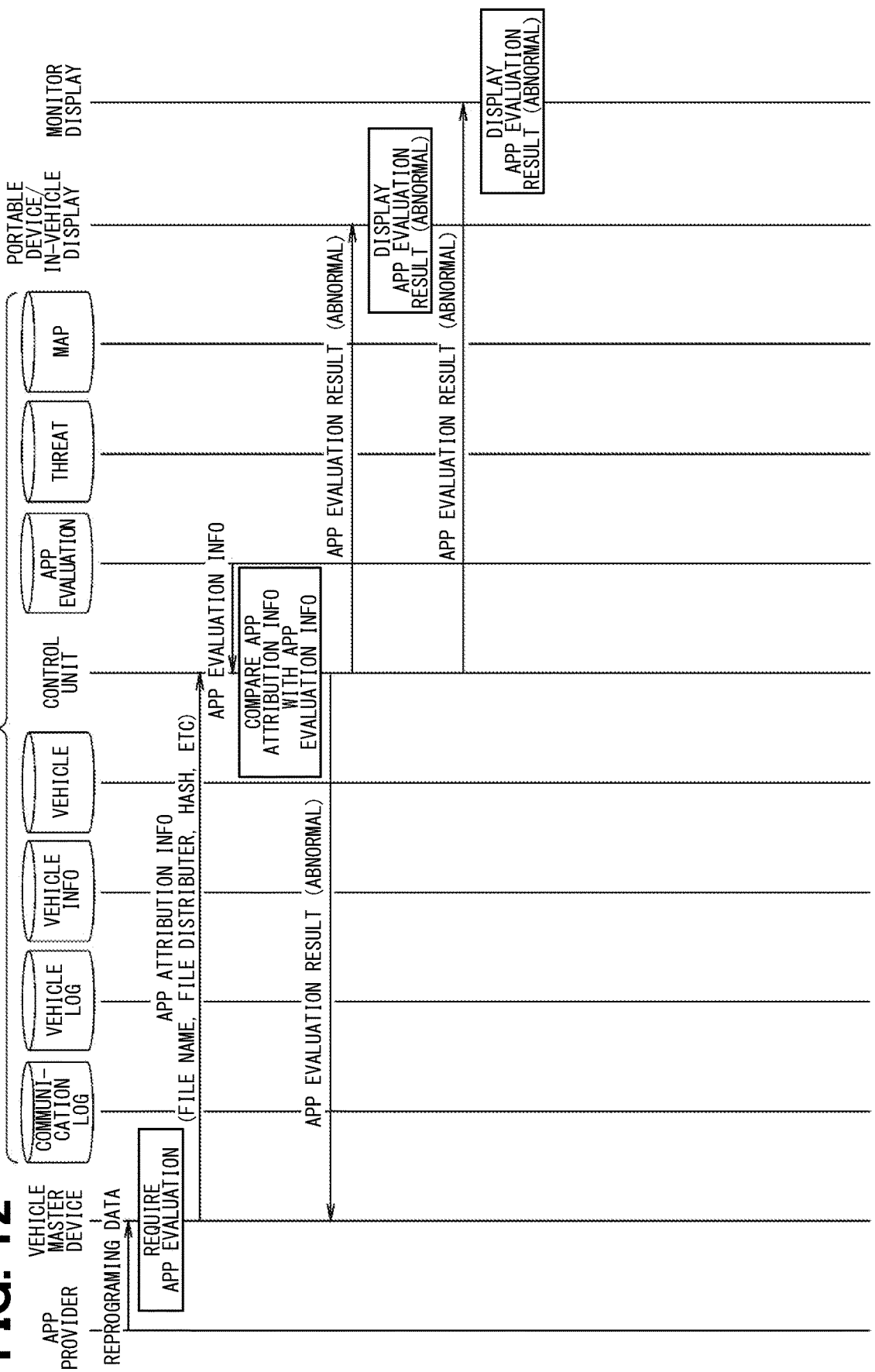
FIG. 12 is a fourth sequence diagram.

FIG. 12 shows a sequence diagram in a case where, in the center device 2, the control unit 15 performs the application program evaluation processing, and determines that the reprogram data is abnormal data. When the center device 2 determines that the reprogram data is abnormal data, the vehicle master device 6 receives the application evaluation result indicating that the reprogram data is abnormal data from the center device 2. In this case, the vehicle master device 6 does not distribute the reprogram data downloaded from the file server 9 to the target ECU, nor rewrite the application program. When the center device 2 determines that the reprogram data is abnormal data at the time of the downloading of the reprogram data from the file server 9 to the vehicle master device 6, the vehicle master device 6 does not rewrite the application program, and after that the log information is not monitored.

Hereinafter, a display screen displayed by the in-vehicle display 12 as a display device on the user side and a display screen displayed by the monitor display 14 as a display device on the monitor side will be described.

Figure 13:
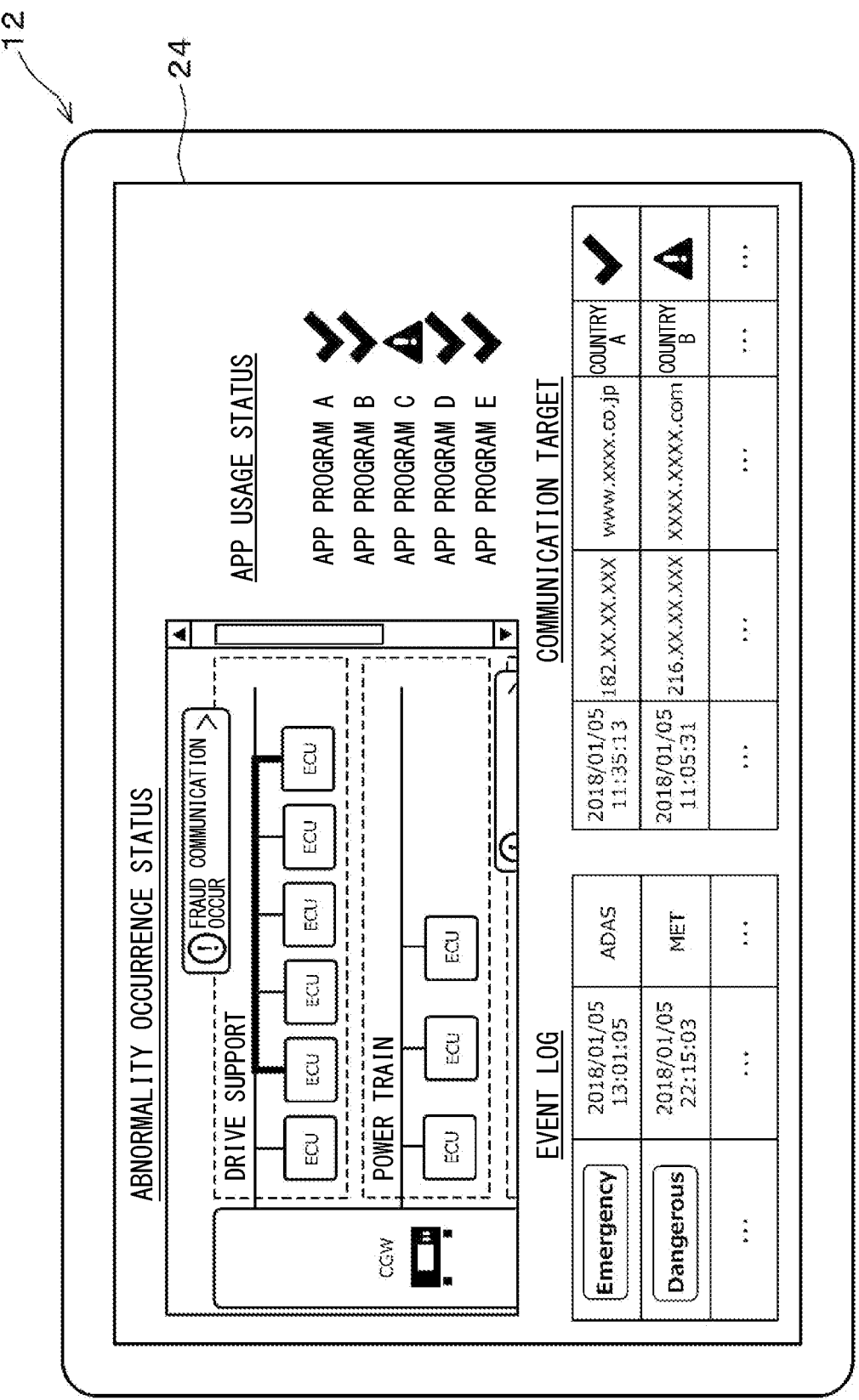
FIG. 13 is a diagram showing a warning screen.
Figure 14:
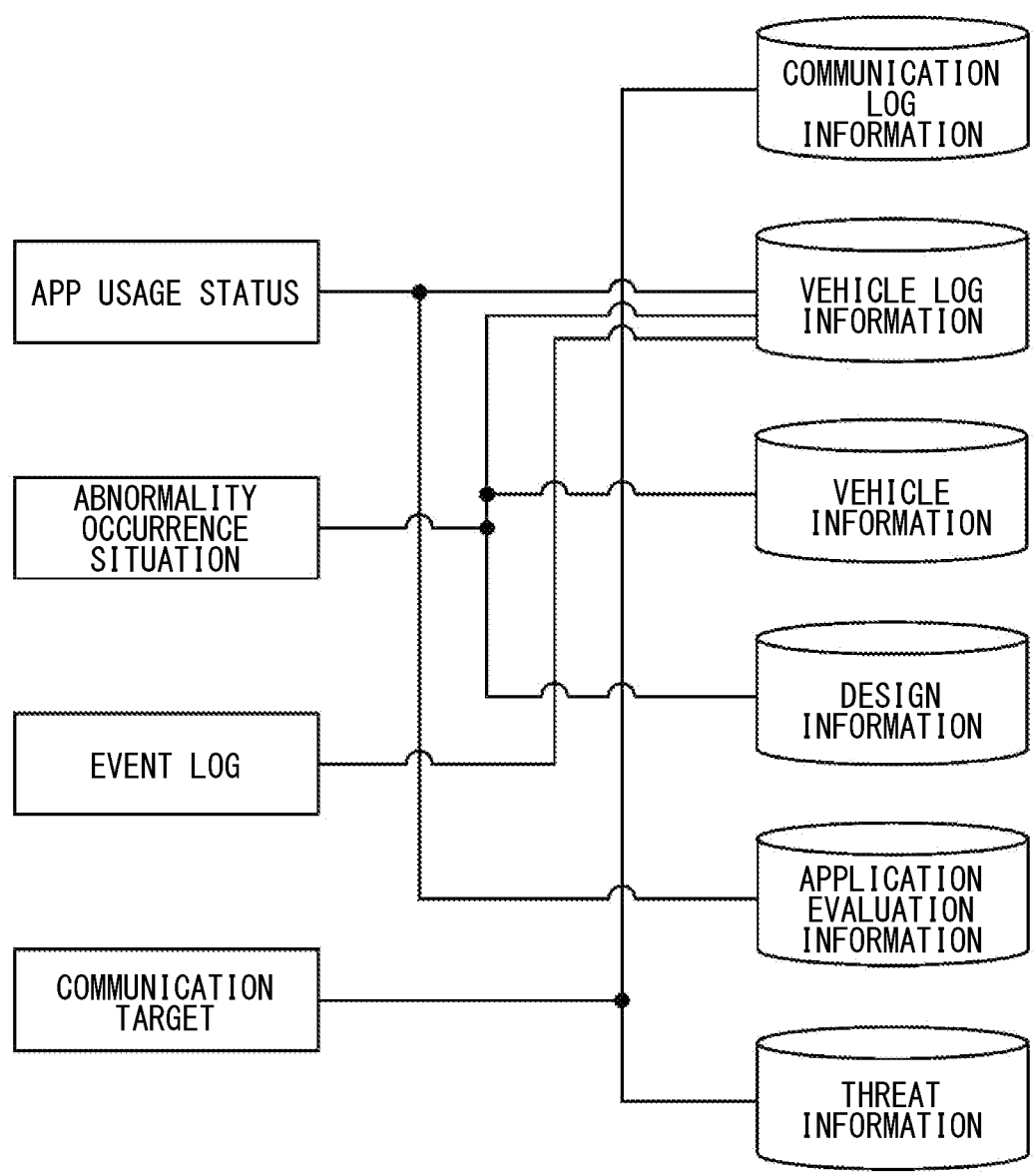
FIG. 14 is a diagram showing a correspondence relationship between various information items and various display items.

FIG. 13 shows a warning screen displayed by the in-vehicle display 12. The in-vehicle display 12 displays, on the warning screen, an application usage status, an abnormality occurrence status, an event log, and a communication target. As shown in FIG. 14, the center device 2 generates the application usage status by integrating the vehicle log information and the application evaluation information, generates the abnormality occurrence status by integrating the vehicle log information, the vehicle information, and the design information, generates the event log based on the vehicle log information, and generates the communication target by integrating the communication log information and the threat information.

The in-vehicle display 12 displays, as the application usage status, whether the reprogram of the application program is normally completed as the application evaluation result. In FIG. 13, the application evaluation result indicating that the reprogram data for each of the application programs A, B, D, and E among the application programs A to E is normal data is received from the center device 2, and the reprogram of the application program is normally completed. The application evaluation result indicating that the reprogram data for the application program C is abnormal data is received from the center device 2, and the reprogram of the application program is not normally completed. For example, the in-vehicle display 12 may display a state in which the reprogram of the application program is normally completed in blue and a state in which the reprogram of the application program is not normally completed in red.

The in-vehicle display 12 displays the abnormality occurrence status as the abnormality detection result by showing a screen equivalent to the individual abnormality status screen in the vehicle shown in FIG. 15, which will be described later. In the event log, the in-vehicle display 12 displays the correspondence among the warning type, the warning occurrence time, and the warning occurrence location, as an abnormality detection result, displays the history of the event occurring in the vehicle, and displays the status of the event. FIG. 13 shows a case where the ADAS event is in an emergency status and the meter event is in a danger status. The in-vehicle display 12 may display, for example, an emergency status in red and a danger status in yellow.

In the communication target, the in-vehicle display 12 displays, as the communication target, the communication time, the IP (Internet Protocol) address of the communication target, and the URL (Uniform Resource Locator) of the communication target, and displays the status of the communication target for the data communication. FIG. 13 shows a case where a data communication status with a communication target having an IP address of "182.XX.XXX.XXX" is normal and a data communication status with a communication target having an IP address of "216.XXXXX.XXX" is abnormal. The in-vehicle display 12 may display, for example, a normal data communication status in blue and an abnormal data communication status in red.

The display screen displayed by the in-vehicle display 12 has been described above, but the mobile terminal 4 displays similar display screen. In addition, the case where the application usage status, the abnormality occurrence status, the event log, and the communication target are displayed on the same display screen has been described, but the application usage status, the abnormality occurrence status, the event log, and the communication target may be separately displayed on each display screen. By displaying the application usage status, the abnormality occurrence status, the event log, and the communication target on the in-vehicle display 12 and mobile terminal 4 as described above, the user can grasp the information regarding the application usage status, the abnormality occurrence status, the event log, and the communication target.

Figure 15:
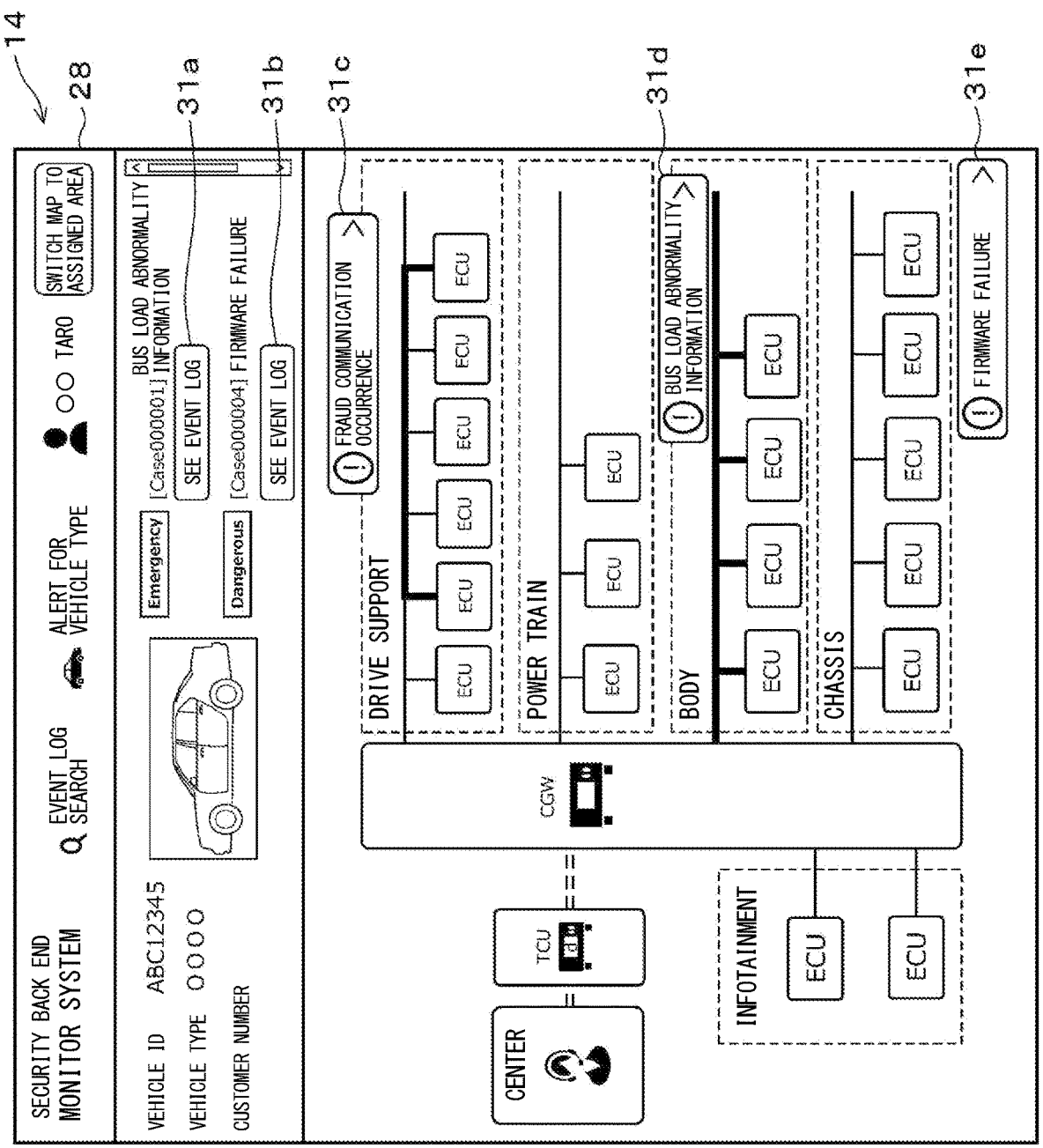
FIG. 15 is a diagram showing an individual abnormality status screen in a vehicle.

FIG. 15 shows an individual abnormality status screen in the vehicle displayed by the monitor device 14. The monitor device 14 displays the occurrence status of an individual abnormality in the vehicle as an abnormality detection result on the individual abnormality status screen of the vehicle. The monitor device 14 separately displays an abnormality of an emergency status (Emergency) and an abnormality of a danger status (Danger). When a "view event log" button 31a for the emergency status is operated, the list of event logs for the emergency status is displayed. When the "view event log" button 31b for the dangerous status is operated, the list of event logs for the dangerous status is displayed. FIG. 15 shows an exemplary case where an unauthorized communication occurs in the driving support system bus, a bus load abnormality occurs in the body system bus, and a firmware abnormality occurs in the chassis system bus. When an "unauthorized communication occurrence" button 31c is operated, the monitor display 14 displays detailed information for the unauthorized communication. When a "bus load abnormality information" button 31d is operated, the monitor display 14 displays detailed information for the bus load abnormality. When a "firmware abnormality" button 31e is operated, the monitor display 14 displays detailed information for the firmware abnormality. When displaying the content of the abnormal status, the monitor device 14 may display different colors for the unauthorized communication, the bus load abnormality, and the firmware abnormality.

Figure 16:
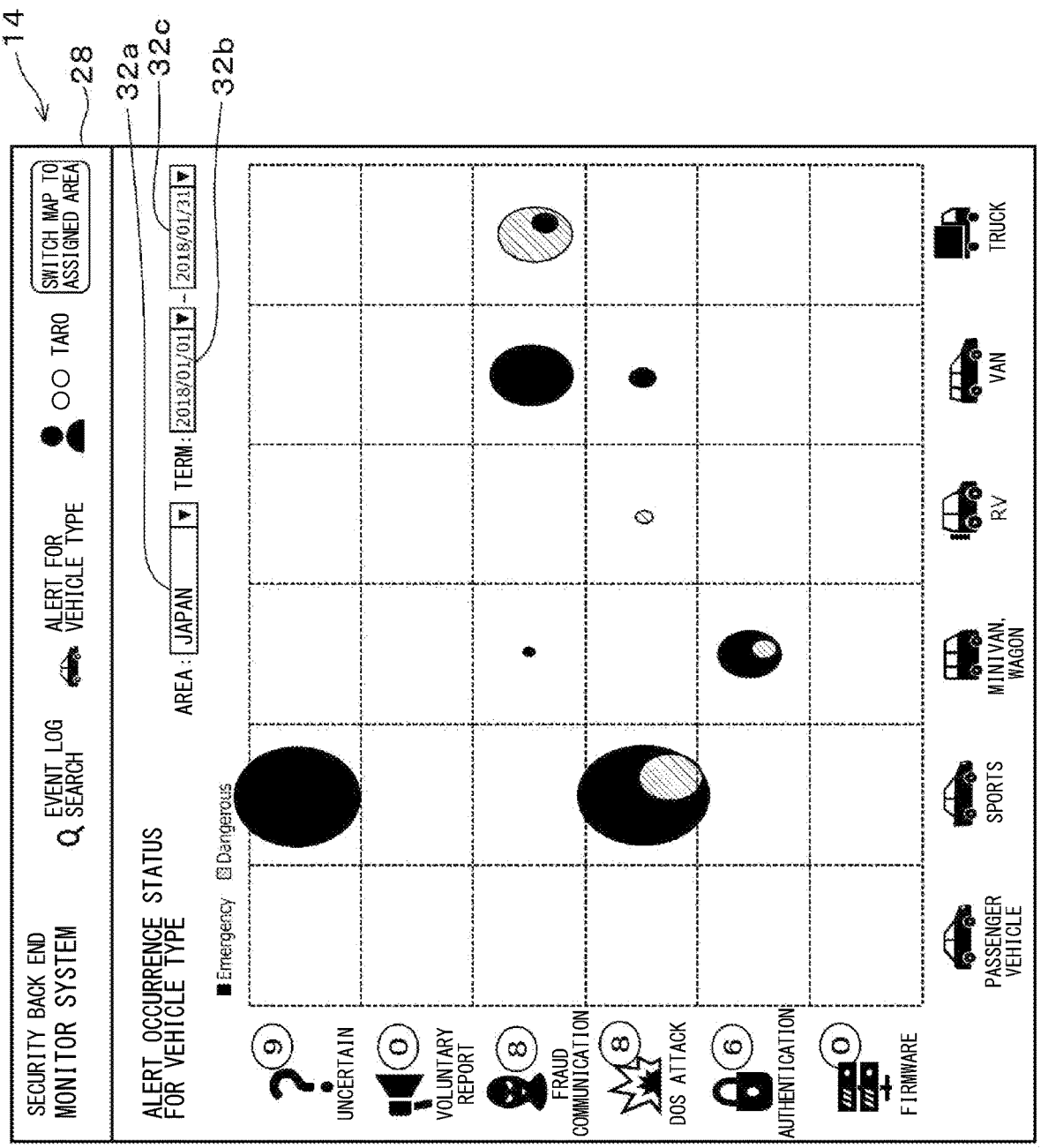
FIG. 16 is a diagram showing an abnormality occurrence tendency screen for each case.

FIG. 16 shows an abnormality occurrence tendency screen for each case displayed by the monitor device 14. On the abnormality occurrence tendency screen for each case, the monitor device 14 displays the alert occurrence status of each vehicle type corresponding to the area selected in the area selection field 32a and the period selected in the period selection fields 32b and 32c as the abnormality detection result. The monitor device 14 displays the occurrence status of each vehicle type, for example, for alerts of firmware, alerts of authentication, alerts of DOS attack, alerts of communication fraud, alerts of voluntary report, and alerts of unknown. In FIG. 16, coordinates are defined having a vertical axis for the alert type and a horizontal axis for the vehicle type. On the coordinates, the number of occurrences is indicated by the size of an ellipse, the emergency alert is indicated by "filling", and the dangerous alert is "hatching". For example, DOS attack alerts that occur in sports-type vehicles include both emergency alerts and dangerous alerts. The number of emergency alerts is relatively large, and the number of emergency alerts is relatively small. For example, the monitor display 14 may display the emergency alert in red and the danger alert in yellow.

Figure 17:
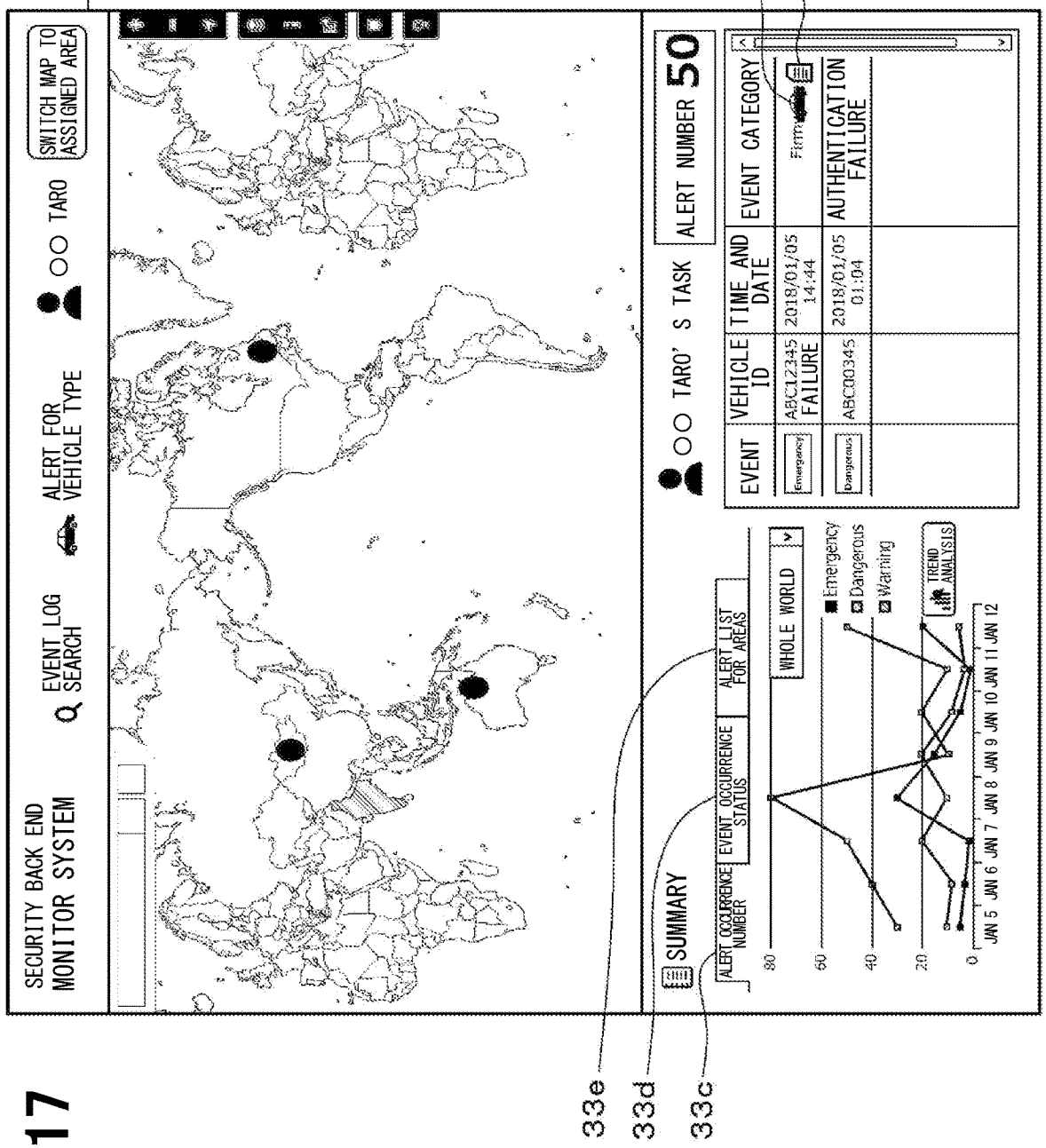
FIG. 17 is a first diagram showing an overview screen of an event occurrence status.
Figure 18:
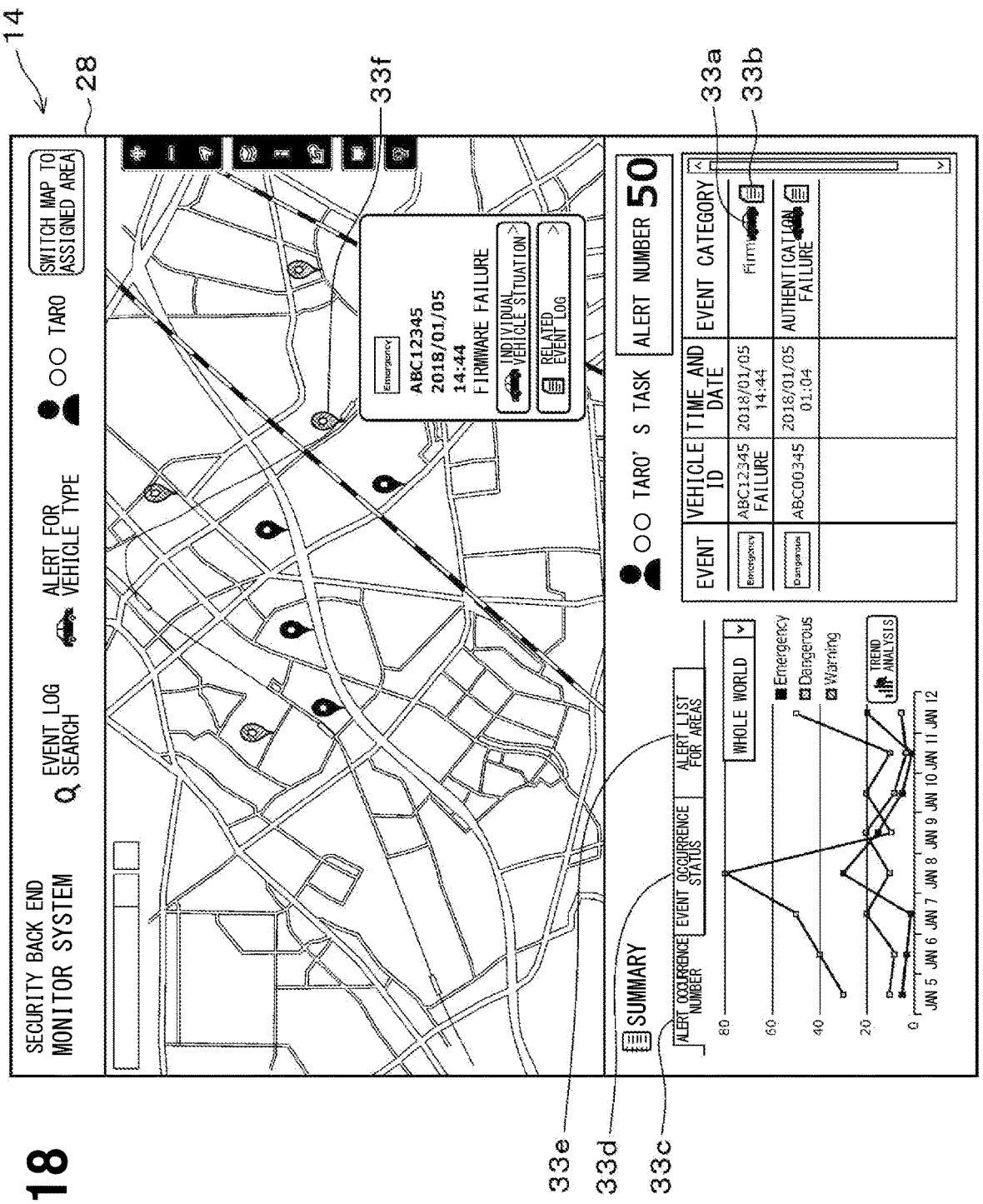
FIG. 18 is a second diagram showing the overview screen of the event occurrence status.

FIGS. 17 and 18 show an overview screen of the event occurrence status displayed by the monitor device 14, respectively. The monitor device 14 displays the event occurrence status for each area as the abnormality detection result on the overview screen of the event occurrence status. In FIG. 17, the emergency alert is indicated by "filling" and the dangerous alert is indicated by "hatching". For example, the emergency alerts have been issued in the east coast area of the United States and the northern area of Australia, and the dangerous alert has been issued in an area of India. The area where the emergency or dangerous alert is occurring, which is shown in FIG. 17, is just an example, and does not mean that the emergency or dangerous alert is actually occurring in that area. For example, the monitor display 14 may display the emergency alert in red and the danger alert in yellow.

When the "vehicle" icon 33a is operated, the monitor device 14 displays a vehicle information related to the corresponding vehicle. When the "memo" icon 33b is operated, the monitor device 14 displays an abnormality occurrence history related to the corresponding vehicle.

Figure 19:
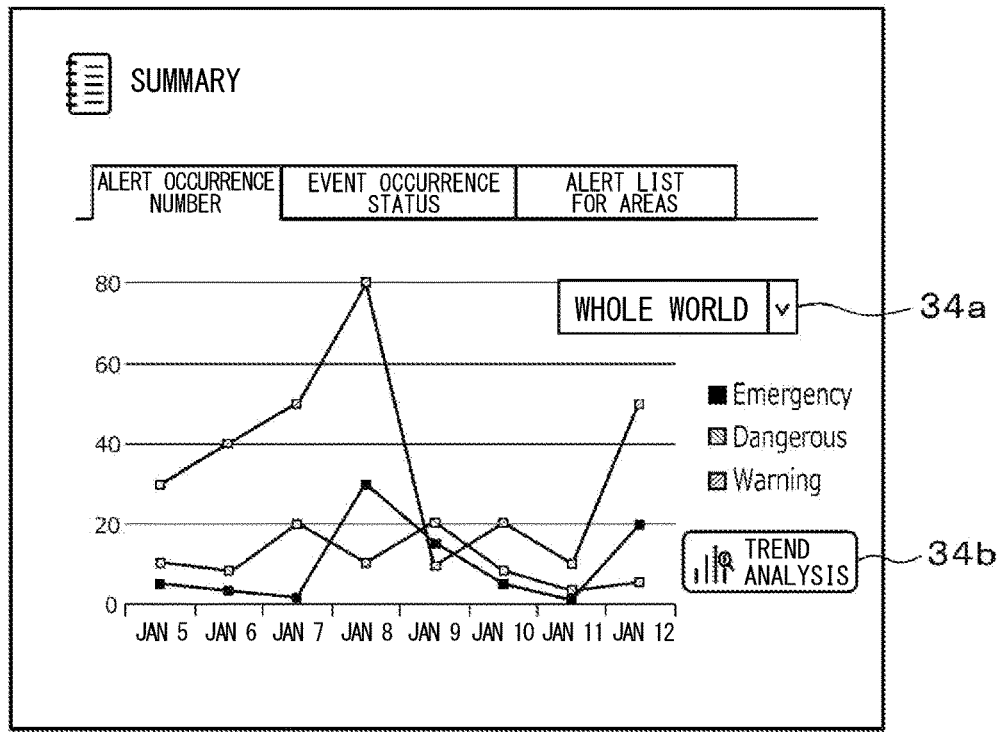
FIG. 19 is a diagram showing the number of alerts.

The monitor device 14 displays the number of alerts, the event occurrence status, and the alert list by area as a summary. When the "alert occurrence number" tab 33c is operated, the monitor device 14 displays the daily transition of the alert occurrence number corresponding to the area selected in the area selection field 34a, as shown in FIG. 19. When the "trend analysis" icon 34b is operated, the monitor device 14 displays the analysis result of the daily transition of the number of alert occurrences. When the monitor device 14 displays the daily transition of the number of alerts, the emergency status, the dangerous status, and the warning status (Warning) may be displayed in different colors.

Figure 20:
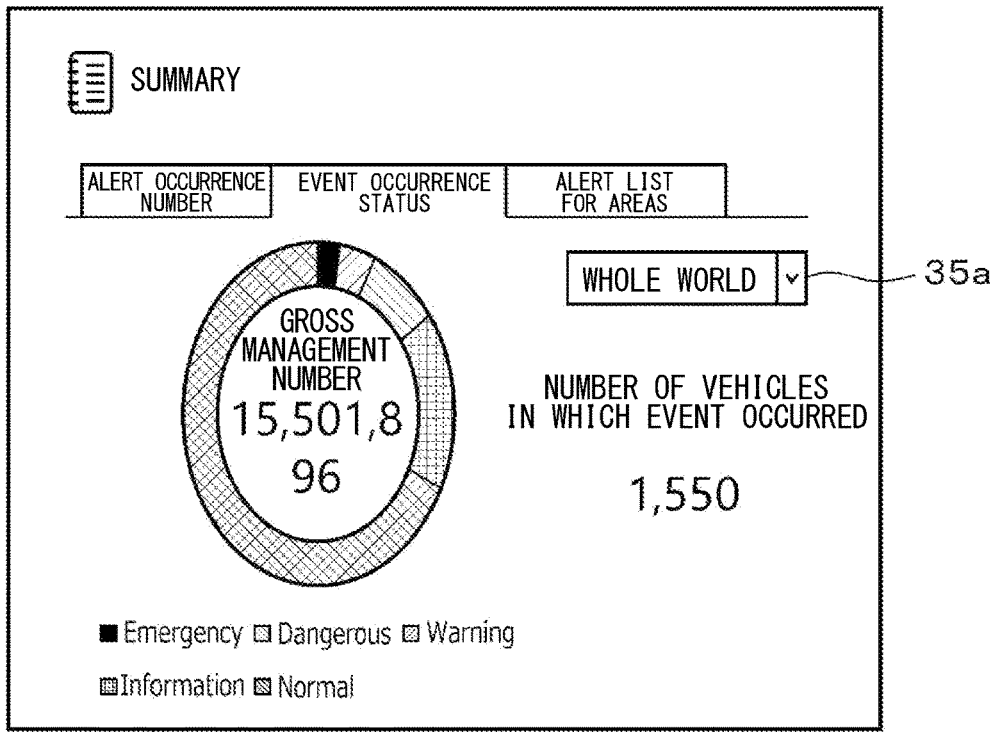
FIG. 20 is a diagram showing an event occurrence status.

When the "event occurrence status" tab 33d is operated, the monitor device 14 displays the occurrence breakdown of the event corresponding to the area selected in the area selection field 35a, as shown in FIG. 20. When displaying the occurrence breakdown of the event, the monitor device 14 may display the emergency status, the dangerous status, the warning status, the information notification status (Information), and the normal status (Normal) in different colors.

Figure 21:
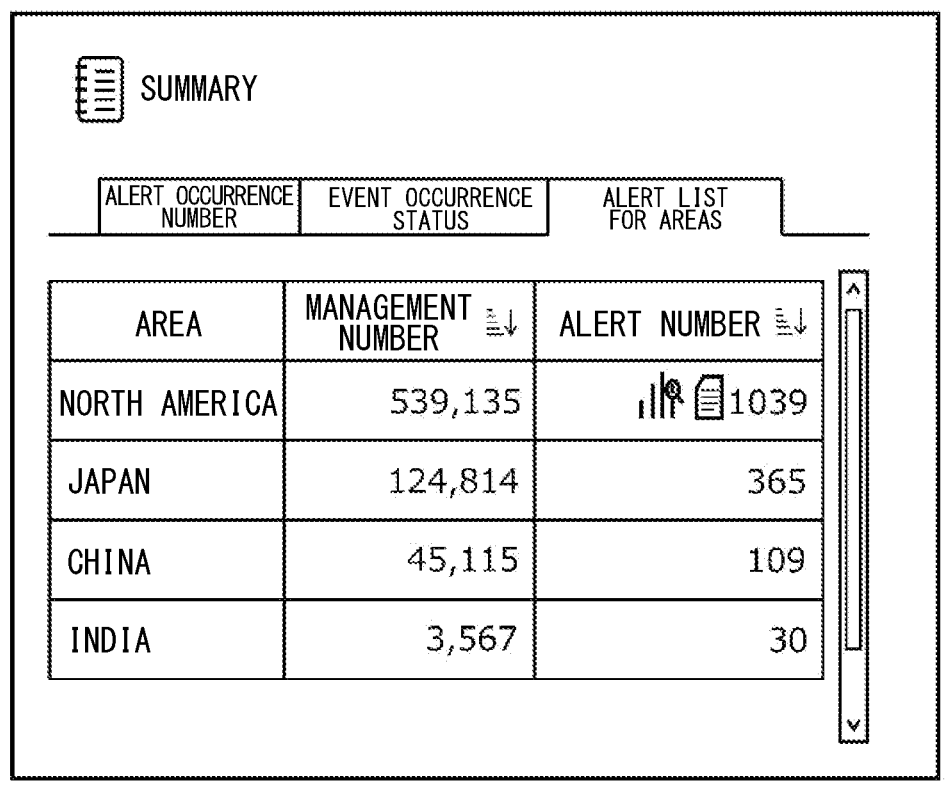
FIG. 21 is a diagram showing a list of alerts by area.

When the "alert list by area" tab 33e is operated, the monitor device 14 displays a list of alerts by area as shown in FIG. 21. When displaying a list by area, the monitor device 14 may sort in descending or ascending order based on the number of managed units or the number of alerts, or may identify the number of managed units or the number of alerts when the number of managed units or the number of alerts exceeds the reference value.

As shown in FIG. 18, when the point icon 33f is operated on the event occurrence status overview screen, the monitor device 14 displays the vehicle ID, the event occurrence date and time, and the event category as details of the event that occurred at that point.

The present embodiment as described above produces the following operational effects.

The center device 2 identifies the vehicle state by integrating the plurality of information items, generates the visualization information from the identification result, and transmits the generated visualization information to the mobile terminal 4, the in-vehicle display 12, and the monitor device 14. The configuration can appropriately present the vehicle state by being visualized to the user and the administrator.

The application usage status integrating the vehicle log information and the application evaluation information, the abnormality occurrence status integrating the vehicle log information, the vehicle information, and the design information, the event log based on the vehicle log information, the communication target integrating the communication log information and the threat information are generated as the visualization information. The configuration can appropriately present, as the application evaluation result, the application usage status by being visualized to the user and the administrator, and appropriately present, as the abnormality detection result, the abnormality occurrence status, the event log, or the communication target by being visualized to the user and the administrator.

The configuration generates, as the visualization information, the individual abnormality status in the vehicle, the abnormality occurrence tendency for each case, and the overview for the event occurrence status. Thus, the configuration can appropriately present the individual abnormality status in the vehicle, the abnormality occurrence tendency for each case, and the overview for the event occurrence status by being visualized to the user and the administrator.

When the individual abnormal status of the vehicle as the visualization information is generated, the occurrence of unauthorized communication, the bus load abnormality information, and the firmware abnormality are generated. Thus, the configuration can present the locations where the unauthorized communication occurs, the bus load abnormality information occurs, and the firmware abnormality occurs by being visualized to the user and the administrator.

When the overview for the event occurrence status is generated as the visualization information, the number of alerts, the event occurrence status, and the alert list by area are generated. Thus, the configuration can appropriately present the daily transition of the number of alert occurrences, the occurrence breakdown of the event, and the list of alerts by area by being visualized to the user and the administrator.

Although the present disclosure has been described in accordance with the embodiments, it is understood that the present disclosure is not limited to the embodiments and structures. The present disclosure may cover various modification examples and equivalent arrangements. Furthermore, various combinations and formations, and other combinations and formations including one, more than one or less than one element may be included in the scope and the spirit of the present disclosure.

The various screens may have any screen configuration.

The controllers and methods described in the present disclosure may be implemented by a special purpose computer which is configured with a memory and a processor programmed to execute one or more particular functions embodied in computer programs of the memory. Alternatively, the controllers described in the present disclosure and the methods thereof may be realized by a dedicated computer configured as a processor with one or more dedicated hardware logic circuits. Alternatively, the controller and methods described in the present disclosure may be realized by one or more dedicated computer, which is configured as a combination of a processor and a memory, which are programmed to perform one or more functions, and a processor which is configured with one or more hardware logic circuits. The computer program may also be stored on a computer readable non-transitory tangible recording medium as instructions to be executed by a computer.

What is claimed is:

1. A center device comprising:
   databases storing a plurality of information items regarding a vehicle of a plurality of vehicles, the databases including (i) a communication log information database storing a communication log information item related to data communication of an in-vehicle communication device for each vehicle of the plurality of vehicles, and (ii) a vehicle log information database storing a vehicle log information item related to a behavior of each vehicle of the plurality of vehicles; and
   a processor configured to
      identify, by integrating at least the communication log information item and the vehicle log information item, a vehicle state related to reprogram data downloaded from a file server to a vehicle master device,
      generate visualization information to be displayed by a display device from an identification result of the vehicle state, and
      transmit the visualization information to the display device.

2. The center device according to claim 1, wherein
   the processor generates, as the visualization information, at least one of an application usage status integrating a vehicle log information item and an application evaluation information item, an abnormality occurrence status integrating the vehicle log information item, a vehicle information item, and a design information item, an event log based on the vehicle log information item, and a communication target integrating a communication log information item and a threat information item.

3. The center device according to claim 1, wherein
   the processor generates, as the visualization information, at least one of an individual abnormality status in the vehicle, an abnormality occurrence tendency for each case of a plurality of cases, and an overview for event occurrence status.

4. The center device according to claim 3, wherein
   when the individual abnormality status in the vehicle is generated as the visualization information, the processor generates at least one of an unauthorized communication occurrence, a bus load abnormality information item, and a firmware abnormality.

5. The center device according to claim 3, wherein
   when the overview for event occurrence status is generated as the visualization information, the processor generates at least one of a number of alerts, an event occurrence status, and an alert list by area.

6. An identification result display system for a vehicle state comprising:
   the center device according to claim 1;
   the display device configured to receive the visualization information from the center device, and display the visualization information.

7. A center device comprising:
   databases storing a plurality of information items regarding a vehicle of a plurality of vehicles;
   a processor configured to
      identify a vehicle state by integrating the plurality of information items stored in the databases;
      generate visualization information to be displayed by a display device from an identification result of the vehicle state; and
      transmit the visualization information to the display device, wherein
   the databases include a communication log information database storing a communication log information item related to data communication of an in-vehicle communication device for each vehicle of the plurality of vehicles, a vehicle log information database storing a vehicle log information item related to a behavior of each vehicle of the plurality of vehicles, and a threat information database storing a threat information item that threatens the behavior of the vehicle, and
   the processor identifies the vehicle state by integrating at least two of the communication log information item, the vehicle log information item, and the threat information item.

8. The center device according to claim 7, wherein the processor generates, as the visualization information, at least one of an application usage status integrating a vehicle log information item and an application evaluation information item, an abnormality occurrence status integrating the vehicle log information item, a vehicle information item, and a design information item, an event log based on the vehicle log information item, and a communication target integrating a communication log information item and a threat information item.

9. The center device according to claim 7, wherein the processor generates, as the visualization information, at least one of an individual abnormality status in the vehicle, an abnormality occurrence tendency for each case of a plurality of cases, and an overview for event occurrence status.

10. The center device according to claim 9, wherein, when the individual abnormality status in the vehicle is generated as the visualization information, the processor generates at least one of an unauthorized communication occurrence, a bus load abnormality information item, and a firmware abnormality.

11. The center device according to claim 9, wherein, when the overview for event occurrence status is generated as the visualization information, the processor generates at least one of a number of alerts, an event occurrence status, and an alert list by area.

12. A non-transitory tangible computer readable storage medium comprising instructions executed by a processor of a center device that includes databases storing a plurality of information items regarding a vehicle of a plurality of vehicles, the databases including (i) a communication log information database storing a communication log information item related to data communication of an in-vehicle communication device for each vehicle of the plurality of vehicles, and (ii) a vehicle log information database storing a vehicle log information item related to a behavior of each vehicle of the plurality of vehicles, and the instructions comprising:
 identifying, by integrating at least the communication log information item and the vehicle log information item, a vehicle state related to reprogram data downloaded from a file server to a vehicle master device;
 generating visualization information to be displayed by a display device from an identification result of the vehicle state; and
 transmitting the visualization information to the display device.

13. An identification result transmission method executed by a center device that includes databases storing a plurality of information items regarding a vehicle, the databases including (i) a communication log information database storing a communication log information item related to data communication of an in-vehicle communication device for each vehicle of the plurality of vehicles, and (ii) a vehicle log information database storing a vehicle log information item related to a behavior of each vehicle of the plurality of vehicles, and the identification result transmission method comprising:
 identifying, by integrating at least the communication log information item and the vehicle log information item, a vehicle state related to reprogram data downloaded from a file server to a vehicle master device;
 generating visualization information to be displayed by a display device from an identification result of the vehicle state; and
 transmitting the visualization information to the display device.

14. A non-transitory tangible computer readable storage medium comprising instructions executed by a processor of a center device that includes databases storing a plurality of information items regarding a vehicle of a plurality of vehicles, wherein the databases includes a communication log information database storing a communication log information item related to data communication of an in-vehicle communication device for each vehicle, a vehicle log information database storing a vehicle log information item related to a behavior of the vehicle, and a threat information database storing a threat information item that threatens the behavior of each vehicle, the instructions comprising:
 identifying a vehicle state by integrating at least two of the communication log information item, the vehicle log information item, and the threat information item;
 generating visualization information to be displayed by a display device from an identification result of the vehicle state; and
 transmitting the visualization information to the display device.

15. An identification result transmission method for a vehicle state executed by a center device that includes databases storing a plurality of information items regarding a vehicle of a plurality of vehicles, wherein the databases includes a communication log information database storing a communication log information item related to data communication of an in-vehicle communication device for each vehicle, a vehicle log information database storing a vehicle log information item related to a behavior of each vehicle, and a threat information database storing a threat information item that threatens the behavior of the vehicle, the identification result transmission method comprising:
 identifying the vehicle state by integrating at least two of the communication log information item, the vehicle log information item, and the threat information item;
 generating visualization information to be displayed by a display device from an identification result of the vehicle state; and
 transmitting the visualization information to the display device.

* * * * *